United States Patent
Kang et al.

(10) Patent No.: US 11,683,483 B2
(45) Date of Patent: *Jun. 20, 2023

(54) METHOD AND APPARATUS FOR ENCODING AND DECODING VIDEO USING INTER-PREDICTION

(71) Applicants: Hyundai Motor Company, Seoul (KR); Kia Motors Corporation, Seoul (KR); Ewha University—Industry Collaboration Foundation, Seoul (KR)

(72) Inventors: Je Won Kang, Seoul (KR); Sang Hyo Park, Seoul (KR); Seung Wook Park, Gyeonggi-do (KR); Wha Pyeong Lim, Gyeonggi-do (KR)

(73) Assignees: Hyundai Motor Company, Seoul (KR); Kia Motors Corporation, Seoul (KR); Ewha University-Industry Collaboration Foundation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/473,365

(22) Filed: Sep. 13, 2021

(65) Prior Publication Data

US 2021/0409695 A1   Dec. 30, 2021

Related U.S. Application Data

(63) Continuation of application No. 17/267,182, filed as application No. PCT/KR2020/007721 on Jun. 15, 2020, now Pat. No. 11,190,761.

(30) Foreign Application Priority Data

| Jun. 14, 2019 | (KR) | ........................ 10-2019-0070633 |
| Jul. 8, 2019 | (KR) | ........................ 10-2019-0082010 |
| Jun. 15, 2020 | (KR) | ........................ 10-2020-0072332 |

(51) Int. Cl.
*H04N 19/107* (2014.01)
*H04N 19/176* (2014.01)
(Continued)

(52) U.S. Cl.
CPC ......... *H04N 19/107* (2014.11); *H04N 19/176* (2014.11); *H04N 19/184* (2014.11); *H04N 19/513* (2014.11); *H04N 19/70* (2014.11)

(58) Field of Classification Search
None
See application file for complete search history.

(56) References Cited

U.S. PATENT DOCUMENTS

| 10,560,712 B2 | 2/2020 | Zou et al. |
| 2017/0214932 A1 | 7/2017 | Huang |

(Continued)

FOREIGN PATENT DOCUMENTS

| KR | 10-2018-0055761 A | 5/2018 |
| KR | 10-2019-0006967 A | 1/2019 |
| RU | 2671307 C1 | 10/2018 |

*Primary Examiner* — Christopher Braniff
(74) *Attorney, Agent, or Firm* — Fox Rothschild LLP

(57) ABSTRACT

Image decoding of decoding a sequence of coded pictures on a block-by-block basis is provided. The image decoding incudes decoding a first high-level syntax element from a bitstream to determine, at a sequence level, whether affine motion prediction is allowed. A second high-level syntax element is extracted for each of at least one coding tool from the bitstream depending on the first high-level syntax element. At a picture level, the method determines whether each of the at least one coding tool is allowed. The coding tool includes sample-by-sample adjustment of affine motion prediction samples.

13 Claims, 15 Drawing Sheets

(51) Int. Cl.
*H04N 19/184* (2014.01)
*H04N 19/513* (2014.01)
*H04N 19/70* (2014.01)

(56) References Cited

U.S. PATENT DOCUMENTS

| | | |
|---|---|---|
| 2017/0332095 A1* | 11/2017 | Zou .................... H04N 19/537 |
| 2017/0374379 A1 | 12/2017 | Chen et al. |
| 2018/0270500 A1* | 9/2018 | Li ........................ H04N 19/52 |
| 2018/0309990 A1 | 10/2018 | Alshina et al. |
| 2019/0110075 A1 | 4/2019 | Wang et al. |

* cited by examiner

METHOD AND APPARATUS FOR ENCODING AND DECODING VIDEO USING INTER-PREDICTION

CROSS-REFERENCE TO RELATED APPLICATION

This application is a Continuation Application of U.S. Ser. No. 17/267,182filed Feb. 9, 2021, which claims priority to Korean Patent Application Nos. 10-2019-0070633, 10-2019-0082010, and 10-2020-0072332 respectively filed on Jun. 14, 2019, Jul. 8, 2019, and Jun. 15, 2020, the entire contents of which are incorporated herein by reference.

TECHNICAL FIELD

The present disclosure relates to encoding and decoding of a video, and more particularly, to a coding tool for improving the compression performance of inter-prediction.

BACKGROUND ART

Since the volume of video data is greater than that of voice data or still image data, storing or transmitting video data without processing for compression requires a lot of hardware resources including memory. Accordingly, in storing or transmitting video data, the video data is generally compressed using an encoder to be stored or transmitted. Then, a decoder receives the compressed video data, and decompresses and reproduces the video data. Compression techniques for such video include H.264/AVC and High Efficiency Video Coding (HEVC), which improves coding efficiency over H.264/AVC by about 40%.

However, the picture size, resolution, and frame rate are gradually increasing, and accordingly the amount of data to be encoded is also increasing. Accordingly, a new compression technique having better encoding efficiency and higher image quality than the existing compression technique is required.

In video encoding, predictive encoding is mainly used to improve compression performance. There are intra-prediction for predicting a target block to be encoded based on pre-reconstructed samples in a current picture, and inter-prediction for predicting a current block using a pre-reconstructed reference picture. In particular, the inter-prediction is widely used for video encoding because it exhibits superior compression performance compared to intra-prediction.

The present disclosure proposes a coding tool for improving the compression performance of the existing inter-prediction.

In particular, the present disclosure relates to a coding tool for improving the compression performance of inter-prediction, and in one aspect, relates to a coding tool capable of compensating for various motions of an object including translation motion.

SUMMARY

In accordance with one aspect of the present disclosure, a video decoding method for decoding a sequence of coded pictures on a block-by-block basis is provided. The method includes setting, at a sequence level, whether affine motion prediction is allowed by decoding a first high-level syntax element from a bitstream; setting, at a picture level, whether each of at least one coding tool is allowed by decoding one or more second high-level syntax elements for each of the at least one coding tool from the bitstream depending on the first high-level syntax element, the at least one coding tool including sample-by-sample adjustment of affine motion prediction samples; when the setting at the sequence level indicates that the affine motion prediction is allowed, determining a plurality of control point motion vectors of a target block encoded using the affine motion prediction, and generating affine prediction samples for each of subblocks in the target block by performing affine motion prediction in the unit of the subblocks using the control point motion vectors; and when it is identified based on the setting at the picture level that the sample-by-sample adjustment of the affine motion prediction samples is allowed for a current picture containing the target block, modifying sample values of the affine prediction samples by compensating for motion according to a sample position in each of the subblocks based on the control point motion vectors of the target block.

In accordance with another aspect of the present disclosure, provided is a video decoding apparatus for decoding a sequence of coded pictures on a block-by-block basis. The apparatus includes a decoder configured to set, at a sequence level, whether affine motion prediction is allowed by decoding a first high-level syntax element from a bitstream, and set, at a picture level, whether each of at least one coding tool is allowed by decoding one or more second high-level syntax elements for each of the at least one coding tool from the bitstream depending on the first high-level syntax element. In particular, the at least one coding tool includes sample-by-sample adjustment of affine motion prediction samples.

The apparatus also includes a predictor configured to determine, when the setting at the sequence level indicates that the affine motion prediction is allowed, a plurality of control point motion vectors of a target block encoded using the affine motion prediction, and generate affine prediction samples for each of subblocks in the target block by performing subblock-by-subblock affine motion prediction using the control point motion vectors. In response to identifying, based on the setting at the picture level, that the sample-by-sample adjustment of the affine motion prediction samples is allowed for a current picture containing the target block, the predictor is configured to modify a sample values of the affine predictions sample by compensating for motion according to a sample position in each of the subblocks based on the control point motion vectors of the target block.

In accordance with another aspect of the present disclosure, a method for encoding a sequence of coded pictures on a block-by-block basis is provided. The method includes encoding, in a header of the sequence, a sequence-level first high-level syntax element to indicate whether both affine motion prediction and at least one coding tool are disabled, the at least one coding tool including sample-by-sample adjustment of affine motion prediction samples; depending on the first high-level syntax element, encoding one or more second high-level syntax elements indicating a setting of a sequence level or a picture level as to whether each of the at least one coding tool is allowed; when the first high-level syntax element indicates that both the affine motion prediction and the at least one coding tool are not disabled, determining control point motion vectors for a target block to be encoded and generating affine prediction samples for each of subblocks by performing subblock-by-subblock affine motion prediction using the control point motion vectors; and when the sample-by-sample adjustment of the affine motion prediction samples is allowed for a current picture containing the target block, modifying sample values of the affine prediction samples by compensating for motion according to a sample position in each of the subblocks based on the control point motion vectors of the target block.

DETAILED DESCRIPTION

Figure 1:
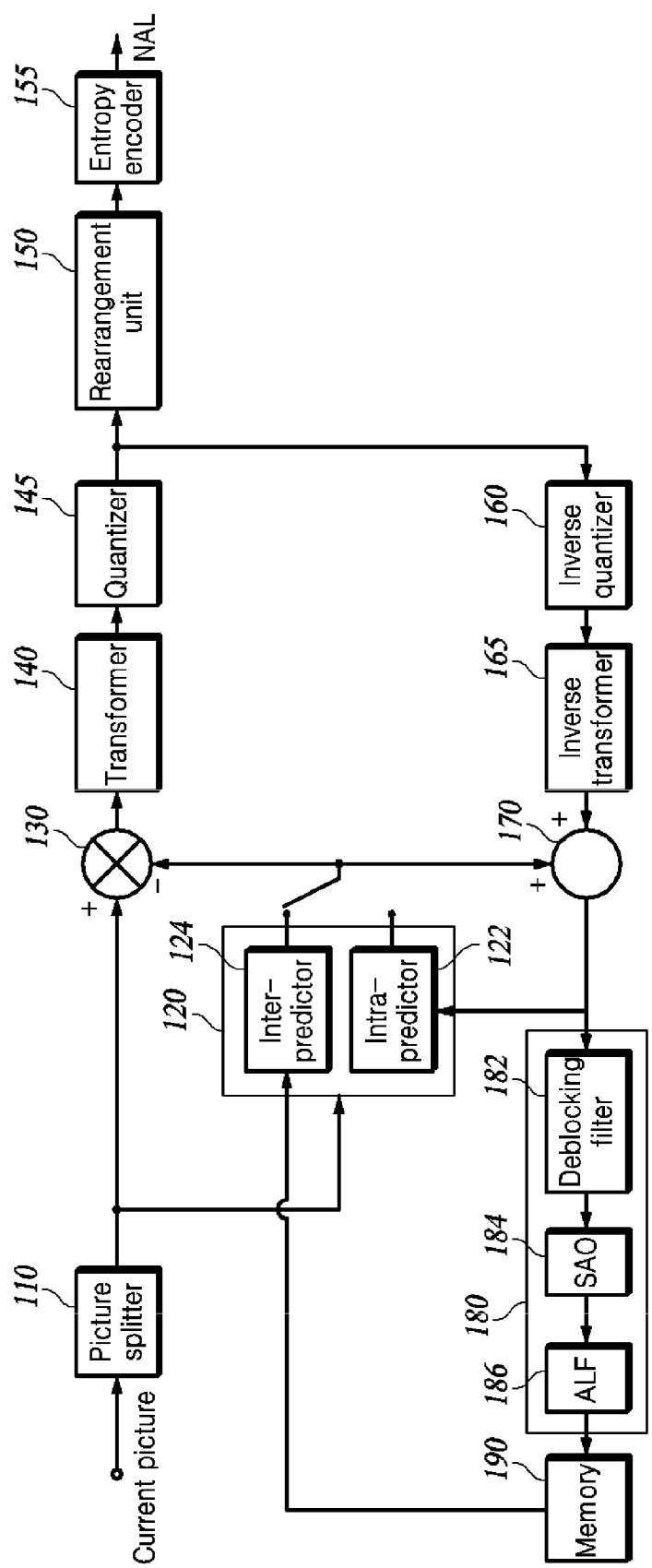
FIG. 1 is an exemplary block diagram of a video encoding apparatus capable of implementing the techniques of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclo-sure, a detailed description of known functions and configurations incorporated herein will be omitted to avoid obscuring the subject matter of the present disclosure.

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus includes a block splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each element of the video encoding apparatus may be implemented in hardware or software, or a combination of hardware and software. The functions of the respective elements may be implemented as software, and a microprocessor may be implemented to execute the software functions corresponding to the respective elements.

One video is composed of one or more sequences including a plurality of pictures. Each picture is split into a plurality of regions, and encoding is performed on each region. For example, one picture is split into one or more tiles or/and slices. In particular, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one slice in common is encoded as a syntax of a slice header, and information applied to all blocks constituting one or more pictures is encoded in a picture parameter set (PPS) or a picture header.

Furthermore, information which a sequence composed of a plurality of pictures refers to in common is encoded in a sequence parameter set (SPS). In addition, information applied to one tile or tile group in common may be encoded as a syntax of a tile or tile group header. The syntaxes included in the SPS, PPS, slice header, and tile or tile group header may be referred to as high-level syntaxes.

The block splitter 110 is configured to determine the size of a coding tree unit (CTU). Information about the size of the CTU (CTU size) is encoded as a syntax of the SPS or PPS and is transmitted to the video decoding apparatus. Additionally, the block splitter 110 is configured to split each picture constituting the video into a plurality of CTUs having a predetermined size, and then recursively splits the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) of the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QuadTree plus BinaryTree (QTBT) structure may be used, or a QuadTree plus BinaryTree TernaryTree (QTBTTT) structure may be used. Here, BTTT may be collectively referred to as a multiple-type tree (MTT).

Figure 2:
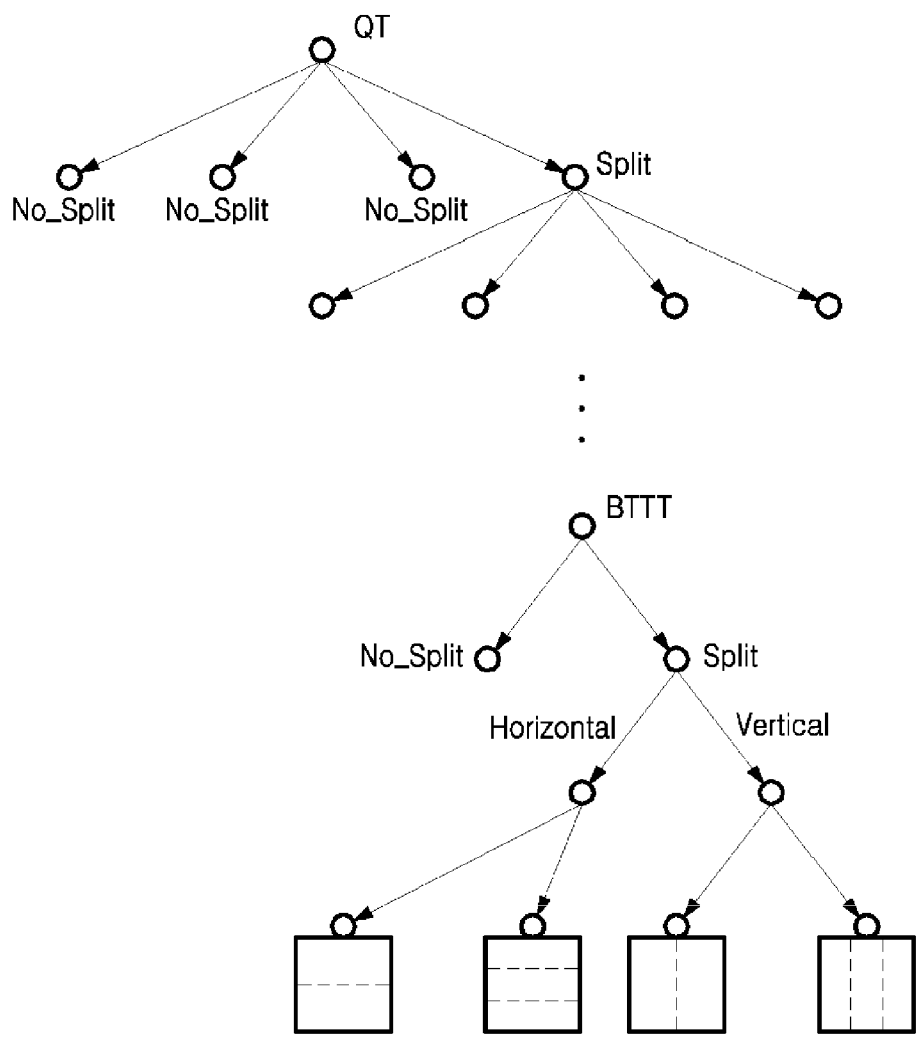
FIG. 2 exemplarily shows block partitioning structure using a QTBTTT structure.

FIG. 2 exemplarily shows a QTBTTT splitting tree structure. As shown in FIG. 2, a CTU may be initially split in the QT structure. The QT splitting may be repeated until the size of the splitting block reaches the minimum block size MinQTSize of a leaf node allowed in the QT. A first flag (QT_split_flag) indicating whether each node of the QT structure is split into four nodes of a lower layer is encoded by the entropy encoder 155 and signaled to the video decoding apparatus. When the leaf node of the QT is equal to or less than the maximum block size (MaxBTSize) of the root node allowed in the BT, it may be further split into one or more of the BT structure or the TT structure. The BT structure and/or the TT structure may have a plurality of splitting directions. For example, there may be two directions, namely, a direction in which a block of a node is horizontally split and a direction in which the block is vertically split.

As shown in FIG. 2, when MTT splitting is started, a second flag (mtt_split_flag) indicating whether nodes are split, a flag indicating a splitting direction (vertical or horizontal) in the case of splitting, and/or a flag indicating a splitting type (Binary or Ternary) are encoded by the entropy encoder 155 and signaled to the video decoding apparatus. Alternatively, prior to encoding the first flag (QT_split_flag) indicating whether each node is split into 4 nodes of a lower layer, a CU splitting flag (split_cu_flag) indicating whether the node is split may be encoded. When the value of the CU split flag (split_cu_flag) indicates that splitting is not performed, the block of the node becomes a leaf node in the splitting tree structure and serves a coding unit (CU), which is a basic unit of encoding. When the value of the CU split flag (split_cu_flag) indicates that splitting is performed, the video encoding apparatus starts encoding the flags in the manner described above, starting with the first flag.

When QTBT is used as another example of a tree structure, there may be two splitting types, which are a type of horizontally splitting a block into two blocks of the same size (i.e., symmetric horizontal splitting) and a type of vertically splitting a block into two blocks of the same size (i.e., symmetric vertical splitting). A split flag (split_flag) indicating whether each node of the BT structure is split into block of a lower layer and splitting type information indicating the splitting type are encoded by the entropy encoder 155 and transmitted to the video decoding apparatus. There may be an additional type of splitting a block of a node into two asymmetric blocks. The asymmetric splitting type may include a type of splitting a block into two rectangular blocks at a size ratio of 1:3, or a type of diagonally splitting a block of a node.

Additionally, CUs may have various sizes according to QTBT or QTBTTT splitting of a CTU. Hereinafter, a block corresponding to a CU (i.e., a leaf node of QTBTTT) to be encoded or decoded is referred to as a "current block." As QTBTTT splitting is employed, the shape of the current block may be square or rectangular. The predictor 120 predicts the current block to generate a prediction block. The predictor 120 includes an intra-predictor 122 and an inter-predictor 124.

Figure 3:
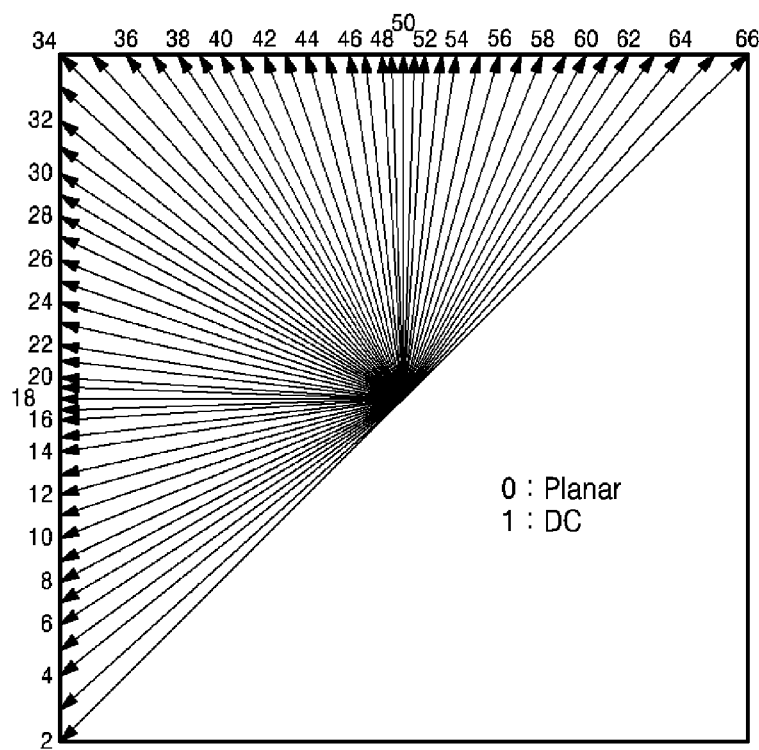
FIG. 3 exemplarily shows a plurality of intra-prediction modes.

The intra-prediction unit 122 is configured to predict samples in the current block using samples (reference samples) positioned around the current block in the current picture including the current block. There is a plurality of intra-prediction modes according to the prediction directions. For example, as shown in FIG. 3, the plurality of intra-prediction modes may include two non-directional modes, which include a planar mode and a DC mode, and 65 directional modes. Neighboring samples and an equation to be used are defined differently for each prediction mode.

The intra-predictor 122 may be configured to determine an intra-prediction mode to be used in encoding the current block. In some examples, the intra-predictor 122 may be configured to encode the current block using several intra-prediction modes and select an appropriate intra-prediction mode to use from the tested modes. For example, the intra-predictor 122 may be configured to calculate rate distortion values using rate-distortion analysis of several tested intra-prediction modes, and select an intra-prediction mode that has the best rate distortion characteristics among the tested modes.

The intra-predictor 122 is configured to one intra-prediction mode from among the plurality of intra-prediction modes, and predict the current block using neighboring pixels (reference pixel) and an equation determined according to the selected intra-prediction mode. Information about the selected intra-prediction mode is encoded by the entropy encoder 155 and transmitted to the video decoding apparatus. The inter-predictor 124 is configured to a prediction block for the current block through a motion compensation. Additionally, the inter-predictor 124 is configured to search for a block most similar to the current block in a reference picture which has been encoded and decoded earlier than the current picture, and generates a prediction block for the current block using the searched block.

Then, the inter-predictor is configured to generate a motion vector corresponding to a displacement between the current block in the current picture and the prediction block in the reference picture. In general, motion estimation is performed on a luma component, and a motion vector calculated based on the luma component is used for both the luma component and the chroma component. The motion information including information about the reference picture and information about the motion vector used to predict the current block is encoded by the entropy encoder 155 and transmitted to the video decoding apparatus.

The inter-predictor 124 may be configured to perform interpolation on a reference picture or a reference block in order to increase prediction accuracy. In other words, sub-samples between two consecutive integer samples are interpolated by applying filter coefficients to a plurality of consecutive integer samples including the two integer samples. When the operation of searching for a block most similar to the current block is performed on the interpolated reference picture, the motion vector may be expressed at a precision level of fractional sample unit, not a precision level of integer sample unit.

The precision or resolution of the motion vector may be set differently for each target region to be encoded, for example, each unit such as a slice, tile, CTU, or CU. When such an adaptive motion vector resolution is applied, information about motion vector resolution to be applied to each target region should be signaled for each target region. For example, when the target region is a CU, information about the motion vector resolution applied to each CU is signaled. The information about the motion vector resolution may be information indicating the precision of a motion vector difference which will be described later.

The inter-predictor 124 may be configured to perform inter-prediction using bi-prediction. In bi-directional prediction, the inter-predictor 124 uses two reference pictures and two motion vectors representing block positions most similar to the current block in the respective reference pictures. The inter-predictor 124 is configured to select a first reference picture and a second reference picture from reference picture list 0 (RefPicList0) and reference picture list 1 (RefPicList1), respectively, search for blocks similar to the current block in the respective reference pictures, and generate a first reference block and a second reference block. Then, the inter-predictor 124 is configured to generate a prediction block for the current block by averaging or weighting the first reference block and the second reference block. Then, the inter-predictor 124 is configured to transfers motion information including information about the two reference pictures and the two motion vectors used to predict the current block to the encoder 150.

Particularly, RefPicList0 may be composed of pictures preceding the current picture in display order among the reconstructed pictures, and RefPicList1 may be composed of pictures following the current picture in display order among the reconstructed pictures. However, embodiments are not limited thereto. Pre-reconstructed pictures following the current picture in display order may be further included in RefPicList0, and conversely, and pre-reconstructed pictures preceding the current picture may be further included in RefPicList1.

Various methods may be used to minimize the number of bits required to encode the motion information. For example, when the reference picture and motion vector of the current block are the same as the reference picture and motion vector of a neighboring block, the motion information about the current block may be transmitted to the decoding apparatus by encoding information for identifying the neighboring block. This method is called a "merge mode."

Figure 4:
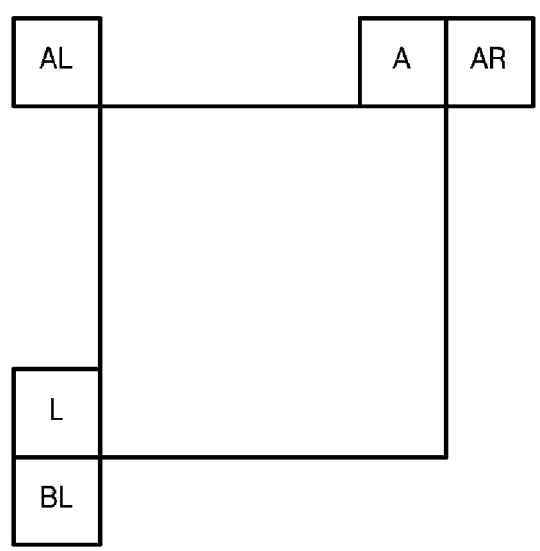
FIG. 4 exemplarily shows neighboring blocks around a current block.

In the merge mode, the inter-predictor 124 selects a predetermined number of merge candidate blocks (hereinafter referred to as "merge candidates") from among the neighboring blocks of the current block. As illustrated in FIG. 4, all or part of a left block L, an above block A, an above right block AR, a bottom left block BL, and an above left block AL, which are adjacent to the current block in the current picture, may be used as neighboring blocks for deriving merge candidates. In addition, a block located within a reference picture (which may be the same as or different from the reference picture used to predict the current block) other than the current picture in which the current block is located may be used as a merge candidate. For example, a co-located block which is at the same position as the current block or blocks adjacent to the co-located block in the reference picture may be additionally used as merge candidates.

The inter-predictor 124 configures a merge list including a predetermined number of merge candidates using such neighboring blocks. The inter-predictor 124 is configured to select a merge candidate to be used as the motion information about the current block from among the merge candidates included in the merge list, and generate merge index information for identifying the selected candidates. The generated merge index information is encoded by the encoder 155 and transmitted to the decoding apparatus.

Another method for encoding the motion information is an AMVP mode. In the AMVP mode, the inter-predictor 124 is configured to derive predicted motion vector candidates for the motion vector of the current block using neighboring blocks of the current block. All or part of the left block L, the above block A, the above right block AR, the bottom left block BL, and the above left block AL, which are adjacent to the current block in the current picture in FIG. 2, may be used as the neighboring blocks used to derive the predicted motion vector candidates. In addition, a block positioned within a reference picture (which may be the same as or different from the reference picture used to predict the current block) other than the current picture including the current block may be used as the neighboring blocks used to derive the predicted motion vector candidates. For example, a co-located block which is at the same position as the current block or blocks adjacent to the co-located block in the reference picture may be used.

The inter-predictor 124 is configured to derive predicted motion vector candidates using the motion vectors of the neighboring blocks, and determines a predicted motion vector for the motion vector of the current block using the predicted motion vector candidates. Then, a motion vector difference is calculated by subtracting the predicted motion vector from the motion vector of the current block.

The predicted motion vector may be obtained by applying a predefined function (e.g., a function for calculating a median, an average, or the like) to the predicted motion vector candidates. In particular, the video decoding apparatus also knows the predefined function. Since the neighboring blocks used to derive the predicted motion vector candidates have already been encoded and decoded, the video decoding apparatus already knows the motion vectors of the neighboring blocks as well. Accordingly, the video encoding apparatus does not need to encode information for identifying the predicted motion vector candidates. Therefore, in this case, the information about the motion vector difference and the information about the reference picture used to predict the current block are encoded.

The predicted motion vector may be determined by selecting any one of the predicted motion vector candidates. In particular, information for identifying the selected predicted motion vector candidate is further encoded along with the information about the motion vector difference and the information about the reference picture which are to be used to predict the current block.

The subtractor 130 is configured to subtract the prediction block generated by the intra-predictor 122 or the inter-predictor 124 from the current block to generate a residual block. The transformer 140 may be configured to split the residual block into one or more subblocks, and apply the transformation to the one or more subblocks, thereby transforming the residual values of the transform blocks from the sample domain to the frequency domain. In the frequency domain, the transformed blocks are referred to as coefficient blocks or transform blocks containing one or more transform coefficient values. A two-dimensional transform kernel may be used for transformation, and one-dimensional transform kernels may be used for horizontal transformation and vertical transformation, respectively. The transform kernels may be based on a discrete cosine transform (DCT), a discrete sine transform (DST), or the like.

The transformer 140 may be configured to transform residual signals in the residual block using the entire size of the residual block as a transformation unit. Alternatively, the residual block may be split into a plurality of subblocks, and the residual signals in the subblocks may be transformed using the subblock as a transformation unit.

The transformer 140 may be configured to transform the residual block in the horizontal direction and the vertical direction individually. For transformation, various types of transform functions or transform matrices may be used. For example, pairs of transform functions for horizontal transformation and vertical transformation may be defined as a multiple transform set (MTS). The transformer 140 may be configured to select one pair of transform functions having the best transformation efficiency in the MTS, and transform the residual block in the horizontal and vertical directions, respectively. The information (mts_idx) on the transform function pair selected in the MTS is encoded by the entropy encoder 155 and signaled to the video decoding apparatus.

The quantizer 145 is configured to quantize transform coefficients output from the transformer 140 using quantization parameters, and output the quantized transform coefficients to the entropy encoder 155. For some blocks or frames, the quantizer 145 may be configured to directly quantize a related residual block without transformation. The quantizer 145 may be configured to apply different quantization coefficients (scaling values) according to the positions of the transform coefficients in a transform block. A matrix of quantized coefficients applied to the two-dimensionally arranged quantized transform coefficients may be encoded and signaled to the video decoding apparatus.

The rearrangement unit 150 may be configured to re-sort the coefficient values for the quantized residual value. The rearrangement unit 150 may be configured to change the 2-dimensional array of coefficients into a 1-dimensional coefficient sequence through coefficient scanning. For example, the rearrangement unit 150 may be configured to scan coefficients from a direct current (DC) coefficient to a coefficient in a high frequency region using a zig-zag scan or a diagonal scan to output a 1-dimensional coefficient sequence. Depending on the size of the transformation unit and the intra-prediction mode, a vertical scan, in which a two-dimensional array of coefficients is scanned in a column direction, or a horizontal scan, in which two-dimensional block-shaped coefficients are scanned in a row direction, may be used instead of the zig-zag scan. In other words, a scan mode to be used may be determined among the zig-zag scan, the diagonal scan, the vertical scan and the horizontal scan according to the size of the transformation unit and the intra-prediction mode.

The entropy encoder 155 is configured to encode the one-dimensional quantized transform coefficients output from the rearrangement unit 150 using uses various encoding techniques such as Context-based Adaptive Binary Arithmetic Code (CABAC) and exponential Golomb, to generate a bitstream. The entropy encoder 155 is configured to encode information such as a CTU size, a CU split flag, a QT split flag, an MTT splitting type, and an MTT splitting direction, which are associated with block splitting, such that the video decoding apparatus may split the block in the same manner as in the video encoding apparatus.

In addition, the entropy encoder 155 is configured to encode information about a prediction type indicating whether the current block is encoded by intra-prediction or inter-prediction, and encodes intra-prediction information (i.e., information about an intra-prediction mode) or inter-prediction information (a merge index for the merge mode, information about a reference picture index and a motion vector difference for the AMVP mode) according to the prediction type. The entropy encoder 155 also encodes information related to quantization, that is, information about quantization parameters and information about a quantization matrix.

The inverse quantizer 160 is configured to inversely quantize the quantized transform coefficients output from the quantizer 145 to generate transform coefficients. The inverse transformer 165 is configured to transform the transform coefficients output from the inverse quantizer 160 from the frequency domain to the spatial domain and reconstructs the residual block.

Further, the adder 170 is configured to add the reconstructed residual block to the prediction block generated by the predictor 120 to reconstruct the current block. The samples in the reconstructed current block are used as reference samples in performing intra-prediction of a next block. The loop filter unit 180 is configured to filter the reconstructed samples to reduce blocking artifacts, ringing artifacts, and blurring artifacts generated due to block-based prediction and transformation/quantization. The loop filter unit 180 may include at least of a deblocking filter 182, a sample adaptive offset (SAO) filter 184, and an adaptive loop filter (ALF) 186.

The deblocking filter 182 is configured to filter the boundary between the reconstructed blocks to remove blocking artifacts caused by block-by-block coding/decoding, and the SAO filter 184 performs additional filtering on the deblocking-filtered video. The SAO filter 184 is a filter used to compensate for a difference between a reconstructed sample and an original sample caused by lossy coding, and performs filtering in a manner that adding a corresponding offset to each reconstructed sample. The ALF 186 is configured to perform filtering on a target sample to be filtered by applying filter coefficients to the target sample and neighboring samples of the target sample. The ALF 186 may be configured to divide the samples included in a picture into predetermined groups, and then determine one filter to be applied to a corresponding group to differentially perform filtering on each group. Information about filter coefficients to be used for the ALF may be encoded and signaled to the video decoding apparatus.

The reconstructed blocks filtered through the loop filter unit 180 are stored in the memory 190. Once all blocks in one picture are reconstructed, the reconstructed picture may be used as a reference picture for inter-prediction of blocks in a picture to be encoded next.

Figure 5:
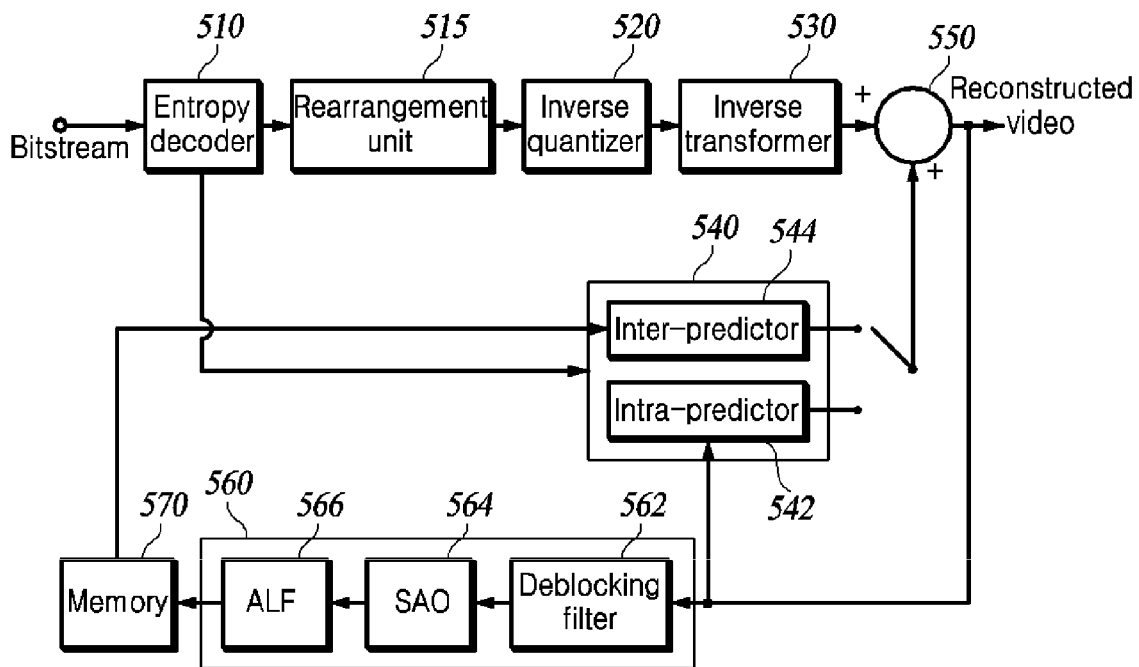
FIG. 5 is an exemplary block diagram of a video decoding apparatus capable of implementing the techniques of the present disclosure.

FIG. 5 is an exemplary functional block diagram of a video decoding apparatus capable of implementing the techniques of the present disclosure. Hereinafter, the video decoding apparatus and elements of the apparatus will be described with reference to FIG. 5. The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each element of the video decoding apparatus may be implemented in hardware, software, or a combination of hardware and software. Further, the function of each element may be implemented in software, and the microprocessor may be implemented to execute the function of software corresponding to each element.

The entropy decoder 510 is configured to determine a current block to be decoded by decoding a bitstream generated by the video encoding apparatus and extracting information related to block splitting, and extract prediction information and information about a residual signal, and the like required to reconstruct the current block. Additionally, the entropy decoder 510 is configured to extract information about the CTU size from the sequence parameter set (SPS) or the picture parameter set (PPS), determines the size of the CTU, and splits a picture into CTUs of the determined size. Then, the decoder is configured to determine the CTU as the uppermost layer, that is, the root node of a tree structure, and extracts splitting information about the CTU to split the CTU using the tree structure.

For example, when the CTU is split using a QTBTTT structure, a first flag (QT_split_flag) related to splitting of the QT is extracted to split each node into four nodes of a sub-layer. For a node corresponding to the leaf node of the QT, the second flag (MTT_split_flag) and information about a splitting direction (vertical/horizontal) and/or a splitting type (binary/ternary) related to the splitting of the MTT are extracted to split the corresponding leaf node in the MTT structure. Accordingly, each node below the leaf node of QT is recursively split in a BT or TT structure.

As another example, when a CTU is split using the QTBTTT structure, a CU split flag (split_cu_flag) indicating whether to split a CU may be extracted. When the corresponding block is split, the first flag (QT_split_flag) may be extracted. In the splitting operation, zero or more recursive MTT splitting may occur for each node after zero or more recursive QT splitting. For example, the CTU may be configured to directly undergo MTT splitting without the QT splitting, or undergo only QT splitting multiple times.

As another example, when the CTU is split using the QTBT structure, the first flag (QT_split_flag) related to QT splitting is extracted, and each node is split into four nodes of a lower layer. Then, a split flag (split_flag) indicating whether a node corresponding to a leaf node of QT is further split in the BT and the splitting direction information are extracted.

Once the current block to be decoded is determined through splitting in the tree structure, the entropy decoder 510 is configured to extract information about a prediction type indicating whether the current block is intra-predicted or inter-predicted. When the prediction type information indicates intra-prediction, the entropy decoder 510 is configured to extract a syntax element for the intra-prediction information (intra-prediction mode) for the current block. When the prediction type information indicates inter-prediction, the entropy decoder 510 is configured to extract a syntax element for the inter-prediction information, that is, information indicating a motion vector and a reference picture referred to by the motion vector.

The entropy decoder 510 is also configured to extract information about quantized transform coefficients of the current block as information related to quantization and information about residual signals. The rearrangement unit 515 may be configured to change the sequence of the one-dimensional quantized transform coefficients entropy-decoded by the entropy decoder 510 to a 2-dimensional coefficient array (i.e., block) in a reverse order of the coefficient scanning performed by the video encoding apparatus.

The inverse quantizer 520 is configured to inversely quantize the quantized transform coefficients using the quantization parameter. The inverse quantizer 520 may be configured to apply different quantization coefficients (scaling values) to the quantized transform coefficients arranged in two dimensions. The inverse quantizer 520 may be configured to perform inverse quantization by applying a matrix of quantization coefficients (scaling values) from the video encoding apparatus to a two-dimensional array of quantized transform coefficients.

The inverse transformer 530 is configured to inversely transform the inversely quantized transform coefficients from the frequency domain to the spatial domain to reconstruct residual signals, thereby generating a reconstructed residual block for the current block. In addition, when the MTS is applied, the inverse transformer 530 is configured to determine transform functions or transform matrices to be applied in the horizontal and vertical directions, respectively, using the MTS information (mts_idx) signaled from the video encoding apparatus, and use the determined transform functions to inversely transform the transform coefficients in the transform block in the horizontal and vertical directions.

The predictor 540 may include an intra-predictor 542 and an inter-predictor 544. The intra-predictor 542 is activated when the prediction type of the current block is intra-prediction, and the inter-predictor 544 is activated when the prediction type of the current block is inter-prediction. The intra-predictor 542 is configured to determine an intra-prediction mode of the current block among a plurality of intra-prediction modes based on the syntax element for the intra-prediction mode extracted from the entropy decoder 510, and predict the current block using the reference samples around the current block according to the intra-prediction mode.

The inter-predictor 544 is configured to determine a motion vector of the current block and a reference picture referred to by the motion vector using the syntax element for the intra-prediction mode extracted from the entropy decoder 510, and predict the current block based on the motion vector and the reference picture. The adder 550 is configured to reconstruct the current block by adding the residual block output from the inverse transformer and the prediction block output from the inter-predictor or the intra-predictor. The samples in the reconstructed current block are used as reference samples in intra-predicting a block to be decoded next.

The loop filter unit 560 may include at least one of a deblocking filter 562, an SAO filter 564, and an ALF 566. The deblocking filter 562 deblocking-filters the boundary between the reconstructed blocks to remove blocking artifacts caused by block-by-block decoding. The SAO filter 564 is configured to perform filtering in a manner of adding the reconstructed block after deblocking filtering to corresponding offsets to compensate for a difference between the reconstructed sample and the original sample caused by lossy coding. The ALF 566 is configured to perform filtering on a target sample to be filtered by applying filter coefficients to the target sample and neighboring samples of the target sample. The ALF 566 may be configured to divide the samples in a picture into predetermined groups, and then determine one filter to be applied to a corresponding group to differentially perform filtering on each group. The filter coefficient of the ALF is determined based on the information about the filter coefficient decoded from the bitstream.

The reconstructed block filtered through the loop filter unit 560 is stored in the memory 570. When all blocks in one picture are reconstructed, the reconstructed picture is used as a reference picture for inter-prediction of blocks in a picture to be encoded next.

The following disclosure relates to coding tools for improving compression performance of inter-prediction, which may be operated by the inter-predictor 124 of the video encoding apparatus and the inter-predictor 544 of the video decoding apparatus. As used herein, the term "target block" may have the same meaning as the terms "current block" or "coding unit (CU)" used above, or may mean a partial region of a CU.

I. Bi-directional Optical Flow

Bi-directional optical flow is a technique for additionally compensating for motions of samples predicted using bi-directional motion prediction, on the assumption that samples or objects constituting a video moves at a constant speed and that there is little change in sample values.

Figure 6:
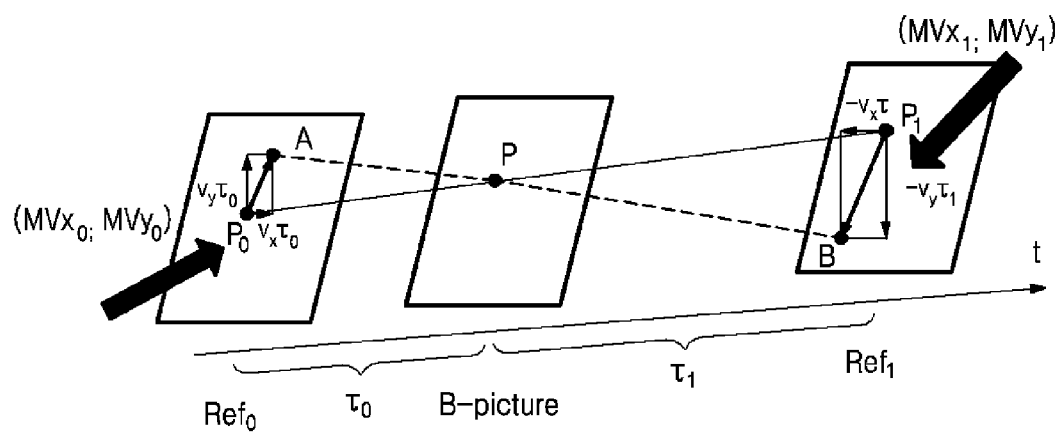
FIG. 6 is an exemplary diagram illustrating the concept of bi-prediction optical flow provided by the present disclosure.

FIG. 6 is an exemplary diagram illustrating the basic concept of BIO. Suppose that bi-directional motion vectors MV0 and MV1 pointing to corresponding regions (i.e., reference blocks) most similar to the to-be-encoded target block in the current picture have been determined in the reference pictures Ref0 and Ref1 by (normal) bi-directional motion prediction for the target block. The two motion vectors have values representing the motion of the entire target block. In the example of FIG. 6, $P_0$ is a sample in the reference picture $Ref_0$ indicated by the motion vector $MV_0$ and corresponding to sample P in the target block, and $P_1$ is a sample in the reference picture $Ref_1$ indicated by the motion vector $MV_1$ and corresponding to sample P in the target block.

Further, suppose that motion for sample P in FIG. 6 is slightly different from the overall motion of the target block. For example, when an object located at sample A in $Ref_0$ of FIG. 6 moves to sample B in $Ref_1$ via sample P in the target block of the current picture, sample A and sample B may have values quite similar to each other. Additionally, in this case, a point in $Ref_0$ most similar to sample P in the target block is not $P_0$ indicated by the bi-directional motion vector $MV_0$, but sample A which has been shifted from $P_0$ by a predetermined displacement vector $(v_x t_0, v_y t_1)$. A point in $Ref_1$ most similar to sample P in the target block is not $P_1$ indicated by the bi-directional motion vector $MV_1$, but sample B which has been shifted from $P_1$ by a predetermined displacement vector $(-v_x t_0, -v_y t_1)$. In particular, $t_0$ and $t_1$ denote time-axis distances of $Ref_0$ and $Ref_1$ with respect to the current picture, respectively, and are calculated based on picture order count (POC). Hereinafter, $(v_x, v_y)$ is referred to as an "optical flow."

In predicting the value of sample P of the current block in the current picture, two reference samples A and B enables more accurate prediction than reference samples $P_0$ and $P_1$ indicated by the bi-directional motion vectors $MV_0$ and $MV_1$. Particularly, $I^{(0)}(i,j)$ denotes a value of a sample in the reference picture $Ref_0$ indicated by the motion vector $MV_0$ as corresponding to the sample $(i,j)$ in the target block, and $I^{(1)}(i,j)$ denotes a value of a sample in the reference picture $Ref_1$ indicated by the motion vector $MV_1$ as corresponding to the sample $(i,j)$ in the target block.

The value of sample A in the reference picture $Ref_0$ indicated by a BIO motion vector $(v_x, v_y)$ as corresponding to the sample in the target block may be defined as $I^{(0)}(i+v_x t_0, j+v_y t_0)$, and the value of sample B in the reference picture $Ref_1$ may be defined as $I^{(1)}(i-v_x t_1, j-v_y t_1)$. Here, when linear approximation is performed using only the first-order term of the Taylor series, A and B may be expressed as Equation 1.

$$A = I^{(0)}(i + v_x \tau_0, j + v_y \tau_0) \quad \text{Equation 1}$$
$$\approx I^{(0)}(i, j) + v_x \tau_0 I_x^{(0)}(i, j) + v_y \tau_0 I_y^{(0)}(i, j)$$

$$B = I^{(1)}(i - v_x \tau_1, j - v_y \tau_1)$$
$$\approx I^{(1)}(i, j) - v_x \tau_1 I_x^{(1)}(i, j) - v_y \tau_1 I_y^{(1)}(i, j)$$

wherein, $I_x^{(k)}$ and $I_y^{(k)}$ (k=0, 1) are gradient values in the horizontal and vertical directions at position (i, j) of $Ref_0$ and $Ref_1$. Additionally, $t_0$ and $t_1$ denote time-axis distances of $Ref_0$ and $Ref_1$ with respect to the current picture, respectively, and are calculated based on POC: $t_0$=POC(current)−POC($Ref_0$), and $t_1$=POC($Ref_1$)−POC(current).

The bi-directional optical flow $(v_x, v_y)$ of each sample in a block is determined as a solution that minimizes Δ, which is defined as a difference between sample A and sample B. Δ may be defined by Equation 2 using the linear approximation of A and B derived from Equation 1.

$$\Delta = A - B \quad \text{Equation 2}$$
$$= (I^{(0)} - I^{(1)}) + v_x(\tau_0 I_x^{(0)} + \tau_1 I_x^{(1)}) + v_y(\tau_0 I_y^{(0)} + \tau_1 I_y^{(1)})$$

For simplicity, the sample position (i, j) is omitted from each term of Equation 2.

To implement more robust optical flow estimation, it is assumed that the motion is locally consistent with neighboring samples. For the BIO motion vector for a sample (i, j) that is currently to be predicted, the differences Δ in Equation 2 for all samples (i', j') present in a mask Ω of a certain size centered on the sample (i, j) are considered. That is, the optical flow for the current sample (i, j) may be determined as a vector that minimizes the objective function $\Phi(v_x, v_y)$, which is the sum of squares of the differences Δ[i', j'] obtained for the respective samples in the mask Ω, as shown in Equation 3.

$$\Phi(v_x, v_y) = \sum_{[i',j'] \in \Omega} \Delta^2[i', j'] \quad \text{Equation 3}$$

The bi-directional optical flow of the present disclosure may be applied in the case where one of two reference pictures used for bi-directional prediction precedes the current picture in display order, the other one follows the current picture, and the distances from the two reference pictures to the current picture are equal to each other, that is, the differences in picture order count (POC) between each reference picture and the current picture are equal to each other. Therefore, $t_0$ and $t_1$ may be ignored.

In addition, the bi-directional optical flow of the present disclosure may be applied only to luma components. The bi-directional optical flow of the present disclosure is performed on a subblock basis, not pixel basis, for the target block to which bi-directional prediction is applied. In the following description, the subblock, which may have various sizes of 2×2, 4×4, and 8×8, is assumed to have a size of 4×4 for simplicity.

Before performing the optical flow, the inter-predictor 124 of the video encoding apparatus generates two reference blocks for the target block using the fore-mentioned bi-directional prediction. The first reference block of the two reference blocks represents a block composed of predicted samples generated from the reference picture $Ref_0$ using the first motion vector $MV_0$ of the target block, and the second reference block represents a block composed of predicted samples generated from the reference picture $Ref_1$ using the motion vector $MV_1$.

The inter-predictor 124 is configured to calculate $(v_x, v_y)$ referred to as an optical flow for each of 4×4 subblocks constituting the target block, using horizontal and vertical gradient values of predicted samples in the first reference block and the second reference block. The optical flow $(v_x, v_y)$ is determined such that the difference between the predicted samples from the reference picture $Ref_0$ and the predicted samples from the reference picture $Ref_1$ is minimized. The inter-predictor 124 is configured to derive a sample offset for modifying bi-directional predicted samples for the 4×4 subblock, using $(v_x, v_y)$ calculated for the 4×4 subblock and gradients of the predicted samples in the 4×4 subblock.

Specifically, the inter-predictor 124 calculates the horizontal and vertical gradients of sample values at position (i, j) using Equation 4.

$$\frac{\partial I^{(k)}}{\partial x}(i, j) = (I^{(k)}(i+1, j) - I^{(k)}(i-1, j)) >> \text{shift1} \quad \text{Equation 4}$$

$$\frac{\partial I^{(k)}}{\partial y}(i, j) = \left(I^{(k)}(i, j+1) - I^{(k)}(i, j-1)\right) >> \text{shift1}$$

wherein, k is 0 or 1, and $I^{(0)}(i,j)$ and $I^{(1)}(i,j)$ denote sample values at position (i,j) in the first reference block and the second reference block, respectively. Additionally, Shift1 is a value derived from bit-depth for a luma component, for example shift1=max(6, bitDepth−6).

Figure 7:
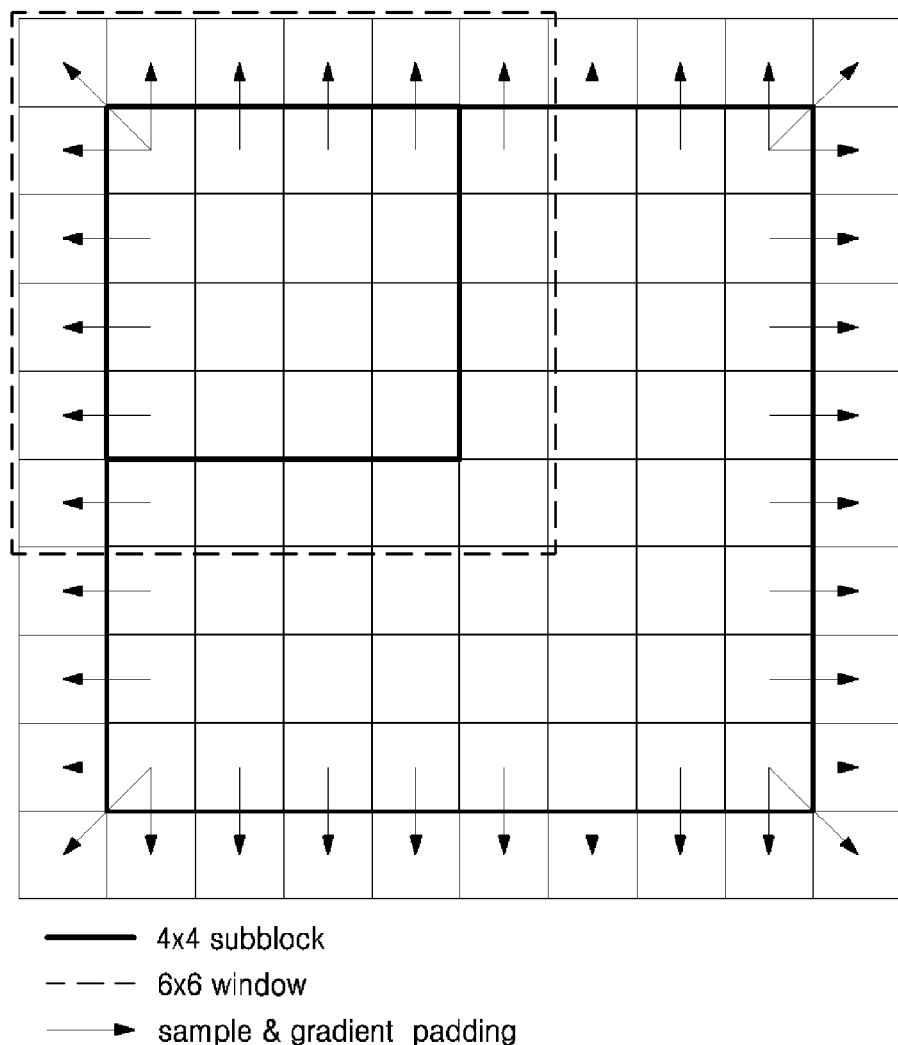
FIG. 7 is an exemplary diagram illustrating a method for deriving a gradient for a block boundary sample in the bi-directional optical flow.

To derive a gradient of a sample located at the boundary of each reference block, samples outside the boundary of the first reference block and the second reference block are needed. Accordingly, as shown in FIG. 7, each reference block is extended by one column to the left and right and by one row to the upper side and lower side. In order to reduce the amount of computation, each sample in the extended portion may be padded with a sample or integer sample at the nearest position in the reference block. Additionally, gradients at a sample position outside the boundary of each reference block may be padded with gradients corresponding to samples at the nearest position.

The inter-predictor 124 is configured to calculate S1, S2, S3, S5, and S6 corresponding to auto-correlation and cross-correlation of gradients using the horizontal and vertical gradients in a 6×6 window covering a 4×4 subblock as shown in FIG. 7.

$$S_1 = \sum_{(i,j)\in\Omega} \psi_x(i, j) \cdot \psi_x(i, j),$$ Equation 5

$$S_3 = \sum_{(i,j)\in\Omega} \theta(i, j) \cdot \psi_x(i, j)$$

$$S_2 = \sum_{(i,j)\in\Omega} \psi_x(i, j) \cdot \psi_y(i, j)$$

$$S_5 = \sum_{(i,j)\in\Omega} \psi_y(i, j) \cdot \psi_y(i, j)$$

$$S_6 = \sum_{(i,j)\in\Omega} \theta(i, j) \cdot \psi_y(i, j)$$

wherein, $\Omega$ denotes a window covering the subblock. In addition, as shown in Equation 6 below, $\Psi_x(i,j)$ denotes the sum of the horizontal gradient values at position (i,j) in the first reference block and the second reference block, $\Psi_y(i,j)$ denotes the sum of the vertical gradient values at position (i,j) position in the first reference block and the second reference block, and $\theta(i,j)$ denotes a difference between the sample value at position (i,j) in the second reference block and the sample value at position (i,j) in the first reference block.

$$\psi_x(i, j) = \left(\frac{\partial I^{(1)}}{\partial x}(i, j) + \frac{\partial I^{(0)}}{\partial x}(i, j)\right) >> n_a$$ Equation 6

$$\Psi_y(i, j) = \left(\frac{\partial I^{(1)}}{\partial y}(i, j) + \frac{\partial I^{(0)}}{\partial y}(i, j)\right) >> n_a$$

$$\theta(i, j) = \left(I^{(1)}(i, j) >> n_b\right) - \left(I^{(0)}(i, j) >> n_b\right)$$

wherein, $n_a$ and $n_b$ are values derived from the bit-depth, and have values of min(1, bitDepth−11) and min(4, bitDepth−8).

The inter-predictor 124 is configured to calculate the optical flows $(v_x, v_y)$ for the 4×4 subblock using Equation 7 based on S1, S2, S3, S5, and S6.

$$v_x = S_1 > 0 ? \text{clip3}(-th'_{BIO}, th'_{BIO}, -((S_3 \cdot 2^{n_b-n_a}) >> \lfloor\log_2 S_1\rfloor)):0$$ Equation 7

$$v_y = S_5 > 0 ? \text{clip3}(-th'_{BIO}, th'_{BIO},$$

$$-((S_6 \cdot 2^{n_b-n_a} - ((v_x S_{2,m}) << n_{S_2} + v_x S_{2,s})/2) >> \lfloor\log_2 S_5\rfloor)):0$$

wherein, $S_{2,m}=S_2>>n_{S_2}$, $S_{2,s}=S_2 \& (2^{n_{S_2}}-1)$, and $th'_{BIO}=2^{max(5, BD-7)}$. $\lfloor \cdot \rfloor$ is a floor function, and $n_{S_2}=12$.

The sample offset for modifying the predicted sample at each sample position (x, y) in the 4×4 subblock in the target block may be calculated using the optical flow calculated for the 4×4 subblock and gradient values at the sample position (x, y), as shown in Equation 8. In Equation 8, rnd( ) represents a round-off operation.

$$b(x, y) = \text{rnd}\left(\left(v_x\left(\frac{\partial I^{(1)}(x, y)}{\partial x} - \frac{\partial I^{(0)}(x, y)}{\partial x}\right)\right)/2\right) +$$ Equation 8

$$\text{rnd}\left(\left(v_y\left(\frac{\partial I^{(1)}(x, y)}{\partial y} - \frac{\partial I^{(0)}(x, y)}{\partial y}\right)\right)/2\right)$$

The inter-predictor 124 is configured to generate a final predicted sample pred(x, y) using the sample offset b(x, y) at position (x, y), and predicted samples $I^{(0)}(x,y)$ and $I^{(1)}(x, y)$ in the first reference block and the second reference block, as in Equation 9.

$$\text{pred}(x,y)=I^{(0)}(x,y)I^{(1)}(x,y)+b(x,y)o_{\text{offset}}>>\text{shift}$$ Equation 9 wherein, shift is Max(3, 15-BitDepth), and $O_{\text{offset}}$ is a value for a rounding-off operation and is half the shift.

As described above, the bi-directional optical flow technique uses values of samples predicted using motion information (two motion vectors and two reference pictures) used for bi-directional prediction. Therefore, the inter-predictor 544 of the video decoding apparatus may also be configured to perform the bi-directional optical flow in the same manner as the video encoding apparatus, using the motion information (motion vectors, reference pictures) for bi-directional prediction received from the video encoding apparatus. It is not required that the video encoding apparatus signals additional information for the bi-directional optical flow process to the video decoding apparatus.

II. Affine Motion Prediction

The inter-prediction described above is motion prediction reflecting a translation motion model. In other words, it is a technique for predicting motion in the horizontal direction (x-axis direction) and the vertical direction (y-axis direction). However, in practice, there may be various types of motions such as rotation, zoom-in, or zoom-out in addition to the translational motion. One aspect of the present disclosure provides affine motion prediction capable of covering such various types of motions.

Figure 8A:
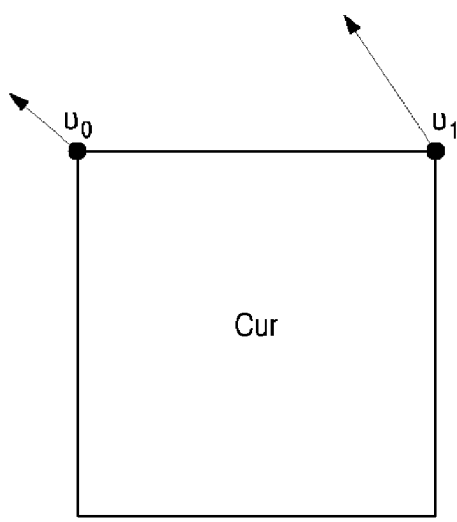
FIGS. 8A-8B and 9 are exemplary diagrams illustrating affine motion prediction provided by the present disclosure.
Figure 8B:
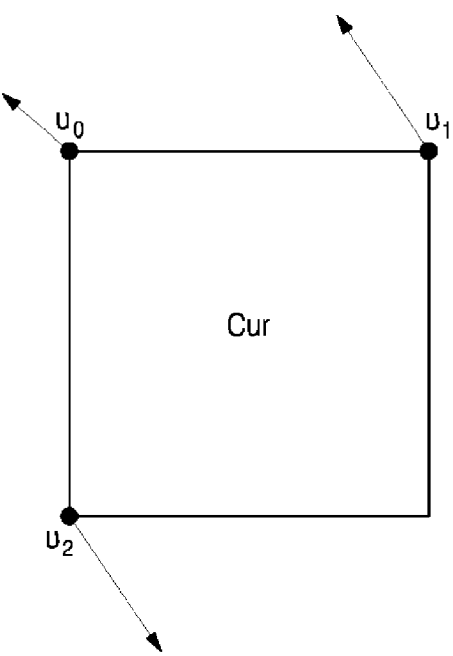

FIGS. 8A-8B are exemplary diagrams illustrating affine motion prediction. There may be two types of models for affine motion prediction. One is a model using the motion vectors of two control points of the top-left corner and top-right corner of a target block to be currently encoded, that is, four parameters, as shown in FIG. 8A. The other model is a model using the motion vectors of three control points of the top-left corner, top-right corner and bottom-left corner of the target block, that is, six parameters, as shown in FIG. 8B.

The four-parameter affine model is expressed by Equation 10. The motion at the sample position (x, y) in the target block may be calculated by Equation 10. Here, the position of the above left sample of the target block is assumed to be (0, 0).

$$\begin{cases} mv_x = \dfrac{mv_{1x} - mv_{0x}}{W}x + \dfrac{mv_{0y} - mv_{1y}}{W}y + mv_{0x} \\ mv_y = \dfrac{mv_{1y} - mv_{0y}}{W}x + \dfrac{mv_{1x} - mv_{0x}}{W}y + mv_{0y} \end{cases} \quad \text{Equation 10}$$

The six-parameter affine model is expressed by Equation 11. The motion at the sample position (x, y) in the target block may be calculated by Equation 11.

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad \text{Equation 11}$$

wherein, $(mv_{0x}, mv_{0y})$ is the motion vector of the top-left corner control point, $(mv_{1x}, mv_{1y})$ is the motion vector of the top-right corner control point, and $(mv_{2x}, mv_{2y})$ is the motion vector of the bottom-left corner control point. W is a constant determined from the horizontal length of the target block, and H is a constant determined from the vertical length of the target block.

Figure 9:
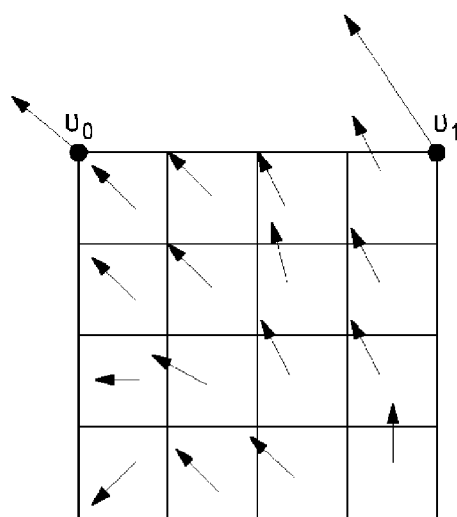

The affine motion prediction may be performed for each sample in the target block using a motion vector calculated through Equation 10 or 11. Alternatively, to reduce the computational complexity, the prediction may be performed for each subblock split from the target block as shown in FIG. 9. For example, the size of the subblock may be 4×4, 2×2, or 8×8. In an exemplary embodiment below, the affine motion prediction for the target block is performed on a 4×4 subblock basis. This example is for convenience of explanation only and the present disclosure is not limited thereto.

In the subblock-based affine motion prediction, the motion vector (affine motion vector) of each subblock is calculated by substituting the center position of each subblock in (x, y) of Equation 10 or 11. Particularly, the center position may be an actual center point of the subblock or the bottom-right sample position of the center point. For example, in the case of a 4×4 subblock in which the coordinates of the bottom-left sample are (0, 0), the center position of the subblock may be (1.5, 1.5) or (2, 2). The predicted block for each subblock is generated using the affine motion vector $(mv_x, mv_y)$ of the subblock.

The motion vectors $(mv_x, mv_y)$ may be set to have 1/16 sample precision. In particular, the motion vector $(mv_x, mv_y)$ calculated through Equation 10 or 11 may be rounded in 1/16 sample units. Adaptive motion vector resolution may be applied to the affine motion prediction as in the normal inter-prediction. Particularly, information about the motion vector resolution of the target block, that is, the precision of the motion vector, is signaled for each target block.

The affine motion prediction may be performed for not only the luma component but also the chroma component. In the case of a 4:2:0 video format, when affine motion prediction for the luma component is performed on a 4×4 subblock basis, affine motion prediction for the chroma component may be performed on a 2×2 subblock basis. The motion vector $(mv_x, mv_y)$ of each subblock of the chroma component may be derived from the motion vector of the corresponding luma component. Alternatively, the size of the subblock for affine motion prediction of the chroma component may be the same as that for the luma component.

When affine motion prediction for the luma component is performed on a 4×4 subblock basis, affine motion prediction for the chroma component is also performed on the 4×4 subblock basis. In this case, since the 4×4 subblock for the chroma component corresponds to four 4×4 subblocks for the luma component, the motion vector $(mv_x, mv_y)$ for the subblock of the chroma component may be calculated by calculating the average of the motion vectors of the four corresponding subblocks of the luma component.

The video encoding apparatus performs intra-prediction, inter-prediction (translational motion prediction), affine motion prediction, and the like, and calculates a rate-distortion (RD) cost to select an optimal prediction method. To perform affine motion prediction, the inter-predictor 124 of the video encoding apparatus determines which of the two types of models to use, and determines two or three control points according to the determined type. The inter-predictor 124 calculates the motion vector $(mv_x, mv_y)$ for each of 4×4 subblocks in the target block using the motion vectors of the control points. Then, it performs motion compensation in a reference picture on a subblock-by-subblock basis using the motion vector $(mv_x, mv_y)$ of each subblock to generate a predicted block for each subblock in the target block.

The entropy encoder 155 of the video encoding apparatus is configured to encode affine related syntax elements including a flag indicating whether affine motion prediction is applied to the target block, type information indicating a type of the affine model, and motion information indicating a motion vector of each control point, and transmit the same to the video decoding apparatus. The type information and the motion information about the control points may be signaled when affine motion prediction is performed, and as many motion vectors of the control points as a number determined according to the type information may be signaled. In addition, when adaptive motion vector resolution is applied, motion vector resolution information about the affine motion vector of the target block is signaled.

The video decoding apparatus is configured to determine the type of the affine model and the control point motion vectors using the signaled syntax elements, and calculates the motion vector $(mv_x, mv_y)$ for each 4×4 subblock in the target block using Equation 10 or 11. When the motion vector resolution information about the affine motion vector of the target block is signaled, the motion vector $(mv_x, mv_y)$ is corrected to a precision identified by the motion vector resolution information through operations such as rounding-off.

The video decoding apparatus is configured to generate a predicted block for each subblock by performing motion compensation within a reference picture using the motion vector $(mv_x, mv_y)$ for each subblock. To reduce the amount in bits required to encode the motion vectors of control points, a method as used in the above-described normal inter-prediction (translational motion prediction) may be applied.

As an example, in the merge mode, the inter-predictor 124 of the video encoding apparatus is configured to derive a motion vector of each control point from neighboring blocks of the target block. For example, the inter-predictor 124 is configured to generate a merge candidate list by deriving a predefined number of merge candidates from neighboring samples L, BL, A, AR, and AL of the target block illustrated in FIG. 4. Each of the merge candidates included in the list corresponds to a pair of motion vectors of two or three control points.

First, the inter-predictor 124 is configured to derive a merge candidate from the control point motion vectors of the neighboring blocks predicted in the affine mode among the neighboring blocks. In some embodiments, the number of merge candidates derived from neighboring blocks predicted in the affine mode may be limited. For example, the inter-predictor 124 may be configured to derive two merge candidates from the neighboring blocks predicted in the affine mode: one of L and BL and one of A, AR, and AL. The priority may be assigned in order of L and BL and in order of A, AR and AL. When the total number of merge candidates is greater than or equal to 3, the inter-predictor 124 may be configured to derive a necessary number of merge candidates from the translational motion vectors of the neighboring blocks.

Figure 10:
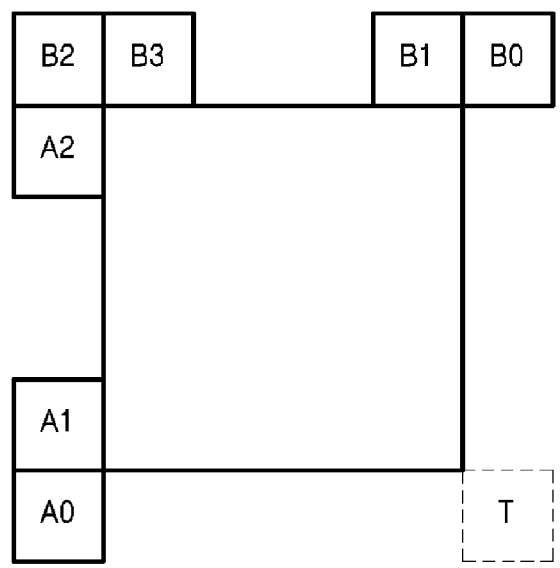
FIG. 10 is an exemplary diagram illustrating a method for deriving merge candidates for affine motion prediction from translation motion vectors of neighboring blocks.

FIG. 10 is an exemplary diagram illustrating a method for deriving merge candidates for affine motion prediction from translation motion vectors of neighboring blocks. The inter-predictor 124 is configured to derive control point motion vectors CPMV1, CPMV2, CPMV3 from a neighboring block group {B2, B3, A2}, a neighboring block group {B1, B0}, and a neighboring block group {A1, A0}, respectively. As an example, the priorities in each neighboring block group may be assigned in order of B2, B3, A2, order of B1 and B0, and order of A1 and A0. In addition, another control point motion vector CPMV4 is derived from a collocated block T in the reference picture. The inter-predictor 124 is configured to generate as many merge candidates as necessary through combinations of two or three control point motion vectors among the four control point motion vectors. The priorities of the combinations are assigned as shown below. The elements in each group are listed in order of the top-left corner, top-right corner, and bottom-left corner control point motion vectors.

{CPMV1, CPMV2, CPMV3}, {CPMV1, CPMV2, CPMV4}, {CPMV1, CPMV3, CPMV4}, {CPMV2, CPMV3, CPMV4}, {CPMV1, CPMV2}, {CPMV1, CPMV3}

The inter-predictor 124 is configured to select a merge candidate in the merge candidate list and performs affine motion prediction on the target block. When the selected candidate consists of two control point motion vectors, affine motion prediction is performed using a four-parameter model. On the other hand, when the selected candidate consists of three control point motion vectors, affine motion prediction is performed using a six-parameter model. The entropy encoder 155 of the video encoding apparatus is configured to encode index information indicating the selected merge candidate among the merge candidates in the merge candidate list and signals the same to the video decoding apparatus.

The entropy decoder 510 of the video decoding apparatus is configured to decode the index information signaled from the video encoding apparatus. The inter-predictor 544 of the video decoding apparatus constructs a merge candidate list in the same manner as the video encoding apparatus, and performs affine motion prediction using control point motion vectors corresponding to the merge candidate indicated by the index information.

As another example, in the AMVP mode, the inter-predictor 124 of the video encoding apparatus is configured to determine the type of the affine model and control point motion vectors for the target block. Then, the inter-predictor 124 is configured to calculate motion vector differences, which are differences between the actual control point motion vectors of the target block and the predicted motion vectors of the respective control points, and transmit the motion vector differences which respectively correspond to the control points.

Accordingly, the inter-predictor 124 of the video encoding apparatus configures a list of a predefined number of affine AMVPs. When the target block is of a 4-parameter type, the candidates included in the list are each composed of a pair of two control point motion vectors. On the other hand, when the target block is of a 6-parameter type, the candidates included in the list are each composed of a pair of three control point motion vectors. The affine AMVP list may be derived using control point motion vectors or translational motion vectors of neighboring blocks in a manner similar to the method for constructing a merge candidate list described above.

However, to derive candidates to be included in the affine AMVP list, there may be a restriction of considering only neighboring blocks that refer to the same reference picture as the target block among the neighboring blocks of FIG. 4.

In addition, in the AMVP mode, the affine model type of the target block should be considered. When the affine model type of the target block is a 4-parameter type, the video encoding apparatus is configured to derive two control point motion vectors (top-left corner and top-right corner control point motion vectors of the target block) using the affine model of a neighboring block. When the affine model type of the target block is a 6-parameter type, the apparatus derives three control point motion vectors (top-left corner, top-right corner and bottom-left control point motion vectors of the target block) using the affine model of a neighboring block.

When the neighboring block is of the 4-parameter type, two or three control point motion vectors are predicted according to the affine model type of the target block using two control point motion vectors of the neighboring block. For example, an affine model of a neighboring block expressed by Equation 10 may be used. In Equation 10, $(mv_{0x}, mv_{0y})$ and $(mv_{1x}, mv_{1y})$ are replaced by the top-left corner and top-right corner control point motion vectors of the neighboring block, respectively. In particular, W is replaced by the horizontal length of the neighboring block. The predicted motion vector for each control point of the target block may be derived by inputting, into (x, y), the difference between the position of the corresponding control point of the target block and the position of the top-left corner of the neighboring block.

When the neighboring block is of the 6-parameter type, two or three control point motion vectors are predicted according to the affine model type of the target block using three control point motion vectors of the neighboring block. For example, an affine model of a neighboring block expressed by Equation 11 may be used. In Equation 11, $(mv_{0x}, mv_{0y})$, $(mv_{1x}, mv_{1y})$, and $(mv_{2x}, mv_{2y})$ are replaced by control point motion vectors of the top-left corner, top-right corner and bottom-left corner of the neighboring block, respectively. In particular, W and H are replaced by the horizontal length and vertical length of the neighboring block, respectively. The predicted motion vector for each control point of the target block may be derived by inputting, into (x, y), the difference between the position of the corresponding control point of the target block and the position of the top-left corner of the neighboring block.

The inter-predictor 124 of the video encoding apparatus is configured to select one candidate in the affine AMVP list, and generates motion vector differences between the motion vector of each actual control point and the predicted motion vector of the corresponding control point of the selected candidate. The entropy encoder 155 of the video encoding apparatus is configured to encode type information indicating the affine model type of the target block, index information indicating a selected candidate among the candidates in the affine AMVP list, and a motion vector difference corresponding to each control point and transmits the same to the video decoding apparatus.

The inter-predictor 544 of the video decoding apparatus is configured to determine the affine model type using the information signaled from the video encoding apparatus, and generates a motion vector difference of each control point. Then, the inter-predictor is configured to generate an affine AMVP list in the same manner as the video encoding apparatus, and select a candidate indicated by the index information signaled in the affine AMVP list. The inter-predictor 544 of the video decoding apparatus is configured to calculate a motion vector of each control point by adding the predicted motion vector of each control point of the selected candidate and a corresponding motion vector difference.

III. Sample-by-Sample Adjustment of Affine Motion Prediction Samples

Subblock-by-subblock affine motion prediction for a target block has been described above. Another aspect of the present disclosure relates to adjusting, on a sample-by-sample basis, sample values of predicted samples generated by subblock-by-subblock affine motion prediction. The motion according to the position of each sample is additionally compensated in each subblock that forms the basis of affine motion prediction.

When the sample values in any one subblock generated as a result of subblock-by-subblock affine motion prediction for a target block are I(x, y), the video encoding apparatus calculates the horizontal and vertical gradients $g_x(i, j)$ and $g_y(i, j)$ at each sample position. Equation 12 may be used to calculate the gradients.

$$g_x(i,j)=I(i+1,j)-I(i-1,j)$$

$$g_y(i,j)=I(i,j+1)-I(i,j-1) \quad \text{Equation 12}$$

The sample offset $\Delta I(i, j)$ for adjusting the prediction sample is calculated by the following equation.

$$\Delta I(i,j)=g_x(i,j)*\Delta mv_x(i,j)+g_y(i,j)*\Delta mv_y(i,j) \quad \text{Equation 13}$$

wherein, $\Delta mv(i,j)$ denotes a motion offset, that is, a difference between the affine motion vector in the sample (i, j) and the affine motion vector at the center position of the subblock, and may be calculated by applying Equation 10 or 11 depending on the affine model type of the target block. In other words, $\Delta mv(i, j)$ may be calculated from Equation 10 or 11 by subtracting the motion vector given when the subblock center position is input to (x, y) from the motion vector given when (i, j) is input to (x, y). Additionally, $\Delta mv(i, j)$ may be calculated from an equation which is obtained by substituting (x, y) in Equations 11 and 12 with the horizontal and vertical offsets from the subblock center position to the sample position (i,j) and removing the last term "+$mv_{0x}$" and "+$mv_{0y}$." The center position may be the actual center point of the subblock, or may be the bottom-right sample position of the center point.

The motion vector of each control point of the target block used for calculation of $\Delta mv(i, j)$ and the difference between the sample position (i, j) and the center position of the subblock are the same for all subblocks. Accordingly, the values of $\Delta mv(i, j)$ may be calculated for only one subblock, for example, a first subblock, and may be reused for the other subblocks.

The technique of the present disclosure is based on the assumption that the object moves at a constant speed and the change in sample values is smooth. Therefore, sample variations in the horizontal direction and the amount of sample change in the vertical direction are obtained by multiplying the x component ($\Delta mv_x$) and y component ($\Delta mv_y$) of $\Delta mv(i, j)$ by the horizontal and vertical sample gradient values, respectively. The sample offset $\Delta I(i,j)$ is calculated by adding the two sample variations. The final value of the predicted sample is calculated as follows.

$$I'(i,j)=I(i,j)+\Delta I(i,j) \quad \text{Equation 14}$$

When sample-by-sample adjustment for affine motion prediction samples is applied, the inter-predictor 124 of the video encoding apparatus and the inter-predictor 544 of the video decoding apparatus perform the above-described process to modifying the sample values of the predicted samples generated through the affine motion prediction. Gradient values are derived from the predicted samples generated through the affine motion prediction, and $\Delta mv(i, j)$ is derived from the control point motion vectors of the target block. Therefore, it is not required that the video encoding apparatus signals additional information for the process of the present technique to the video decoding apparatus.

IV. Local Illumination Compensation for Affine Motion Prediction Samples

The local illumination compensation technique is a coding technique of compensating for variation in illumination between the target block and the predicted block with a linear model. The inter-predictor 124 of the video encoding apparatus is configured to determine a reference block in a reference picture using the motion vector (translational motion vector) of the target block, and obtain parameters of a linear model for illumination compensation using pre-reconstructed samples around (on the upper and left sides of) the reference block and pre-reconstructed samples around (on the upper and left sides of) the target block.

When the pre-reconstructed samples around the reference block are referred to as x and the corresponding pre-reconstructed samples around the target block are referred to as y, parameters "A" and "b" are derived as in Equation 15 such that the sum of squares of the differences between y and (Ax+b) is minimized.

$$\text{argmin}\{\Sigma(y-Ax-b)^2\} \quad \text{Equation 15}$$

The final predicted samples are generated by applying the weight of A and the offset of b to the samples in the predicted block (reference block) generated by the motion vector of the target block, as shown in Equation 16. In Equation 16, pred[x][y] is a predicted sample at position (x, y) generated by the motion vector of the target block, and $\text{pred}_{LIC}[x][y]$ is the final predicted sample after illumination compensation.

$$\text{pred}_{LIC}[x][y]=A*\text{pred}[x][y]+b \quad \text{Equation 16}$$

Another aspect of the present disclosure relates to a technique for combining the illumination compensation technique with affine motion prediction.

As described above, when subblock-by-subblock affine motion prediction is applied to the target block, a motion vector is generated for each of the subblocks. The illumination compensation parameters may be derived using the corresponding motion vector for each subblock, and then the illumination compensation may be performed in the unit of the subblocks using the corresponding motion vector. This, however, not only increases the complexity of calculation but also causes a delay issue. Since the reconstructed samples in each subblock are needed for illumination compensation of the next subblock, the illumination compensation process for the subblock should be suspended until an adjacent subblock is reconstructed (that is, until both the prediction block and the residual block for the subblock are reconstructed). The present disclosure is directed to addressing such issues.

Figure 11A:
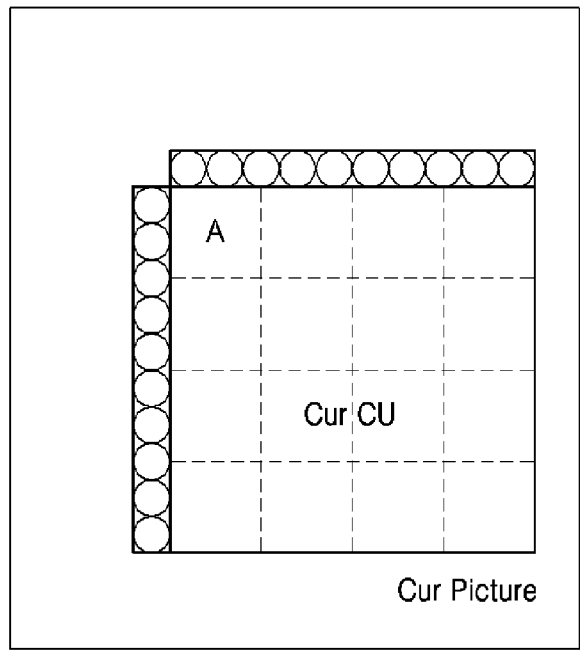
FIGS. 11A-11c are exemplary diagrams illustrating a method for deriving an illumination compensation parameter according to an embodiment of illumination compensation provided by the present disclosure.
Figure 11A:
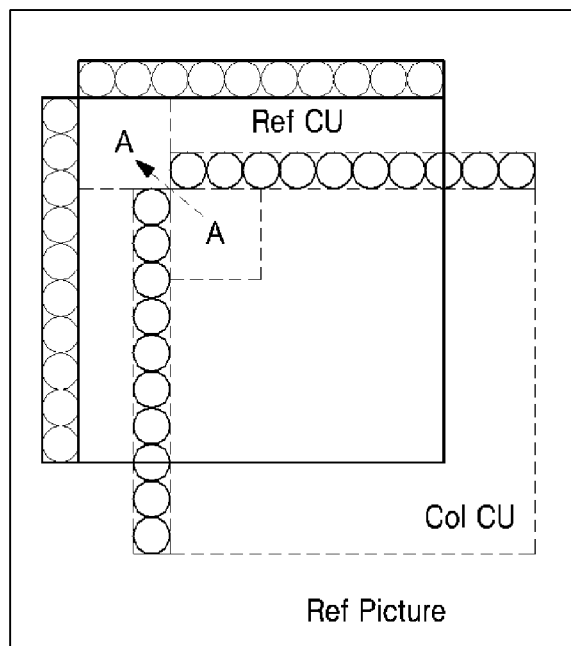
Figure 11B:
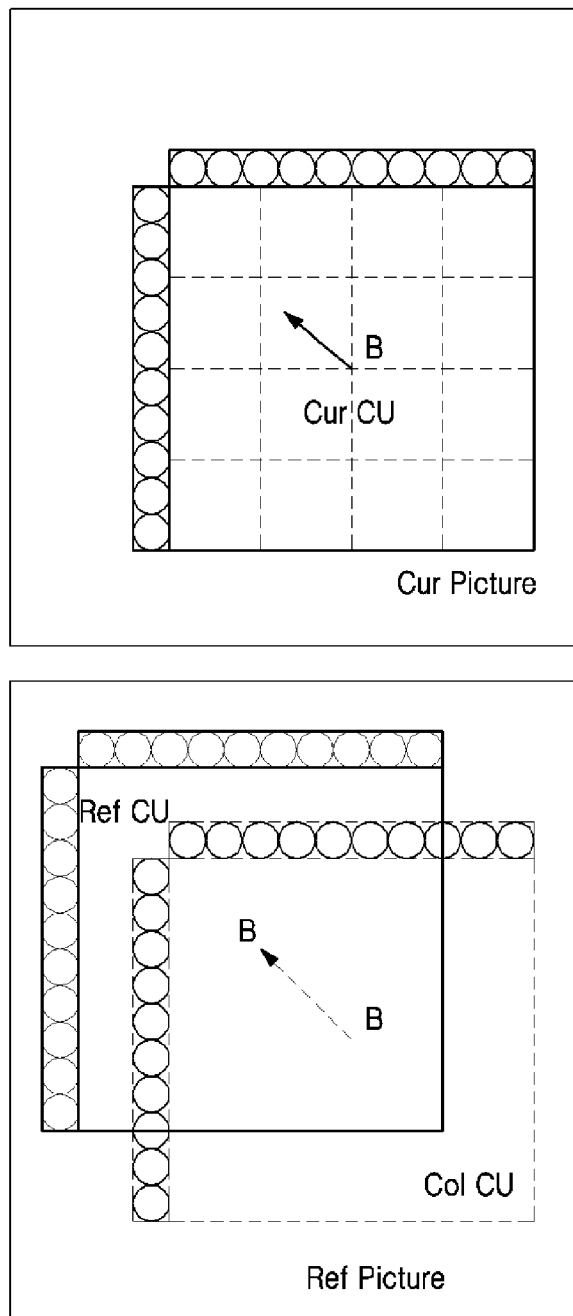
Figure 11C:
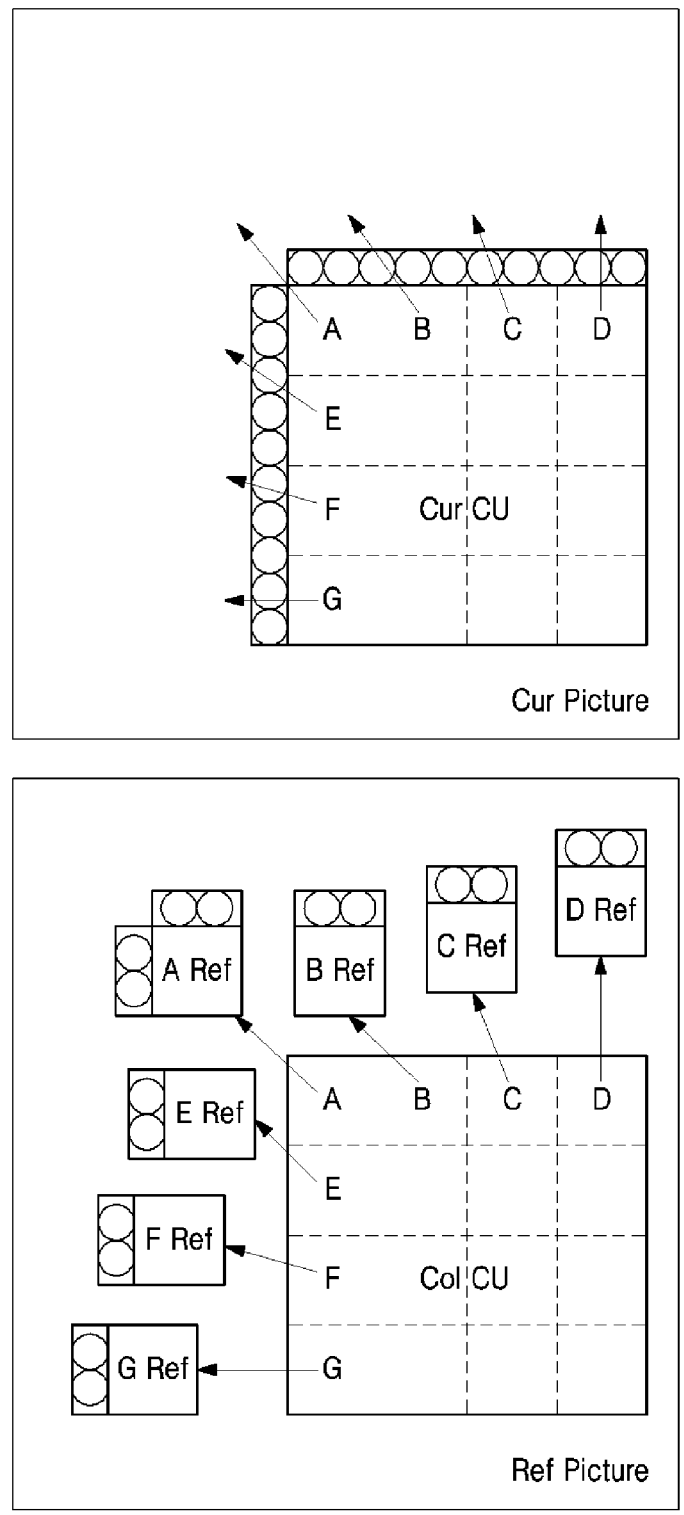

FIGS. 11A-11C show various examples of determining the position of a reference block to derive an illumination compensation parameter according to an embodiment of the present disclosure. In this embodiment, one illumination compensation parameter set (A, b) for the target block is derived, and the same parameter is applied to all subblocks in the target block. That is, the entire target block is modified with one illumination compensation parameter set.

As shown in FIG. 11A, the inter-predictor 124 of the video encoding apparatus may be configured to determine the position of the reference block in the reference picture using the affine motion vector of the subblock located at the top left of the target block or the top-left corner control point motion vector of the target block. The pre-reconstructed samples around the determined reference block are used for parameter derivation. Alternatively, as shown in FIG. 11B, the position of the reference block may be determined using the affine motion vector of the center subblock in the target block. Once the position of the reference block is determined, the illumination compensation parameter is derived using the pre-reconstructed samples adjacent to the top and left sides of the reference block and the corresponding pre-reconstructed samples adjacent to the top and left sides of the target block.

As another example, a plurality of subblocks in the target block may be used. As shown in FIG. 11C, the inter-predictor 124 determines a reference subblock corresponding to each boundary subblock using affine motion vectors of the subblocks (boundary subblocks) located at the boundary in the target block. Samples for deriving the illumination compensation parameter are extracted from pre-reconstructed samples adjacent to the boundary subblocks in the target block and the corresponding reference subblocks, respectively. For the subblocks located at the top boundary in the target block and the corresponding reference subblocks, the samples are extracted from pre-reconstructed samples adjacent to the top side. For the subblocks located at the left boundary in the target block and the corresponding reference subblocks, the samples are extracted from pre-reconstructed samples adjacent to the left side.

In the present embodiment, since an illumination compensation parameter is derived using the pre-constructed samples around the target block and the pre-constructed samples around the reference block, the aforementioned issue of delay may be addressed. However, applying only one illumination compensation parameter to the target block to which subblock-by-subblock affine motion prediction is applied may potentially result in lower coding efficiency. Another embodiment described below leads to an increase in coding efficiency as a trade-off for a slight increase in complexity.

According to another embodiment of the present disclosure, the inter-predictor 124 of the video encoding apparatus splits a target block into a plurality of regions. Each region includes at least one subblock which is a unit in which affine motion prediction is performed. The inter-predictor 124 is configured to calculate illumination compensation parameters for a plurality of regions, and performs illumination compensation in units of regions or subblocks in the target block based on the calculated illumination compensation parameters.

1. Splitting of Target Block

The inter-predictor 124 of the video encoding apparatus is configured to split the target block into a plurality of regions each including one or more subblocks, which are units in which affine motion prediction is performed.

Figure 12A:
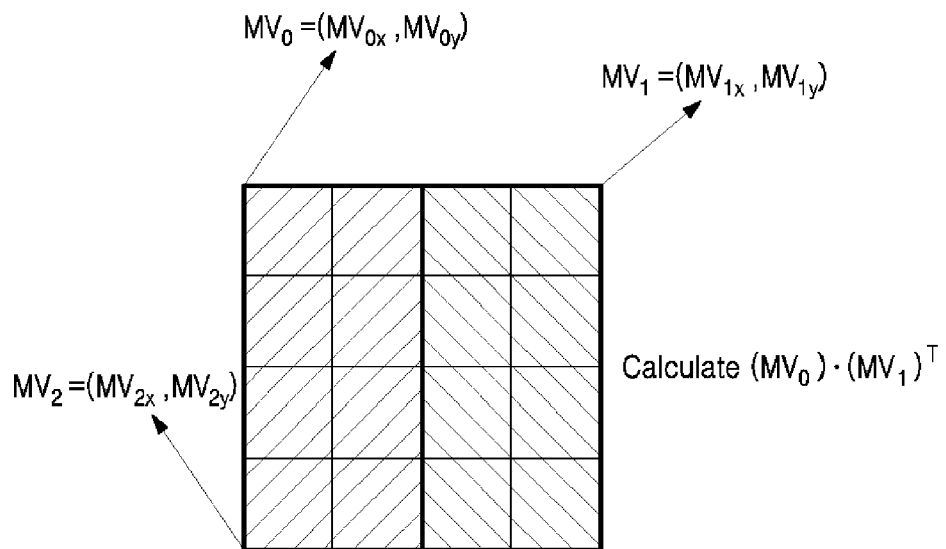
FIGS. 12A-12B are exemplary diagrams illustrating a method for splitting a target block into a plurality of regions according to another embodiment of illumination compensation provided by the present disclosure.
Figure 12B:
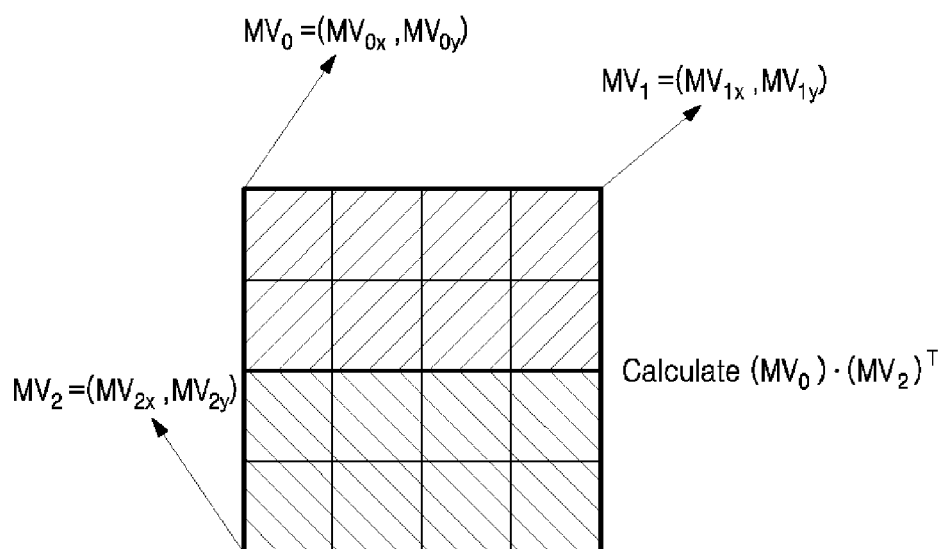

The target block may be divided by using the control point motion vectors of the target block. FIGS. 12A-12B are examples of splitting a target block using control point motion vectors. Referring to FIG. 12A, when the angle between the top-left corner control point motion vector $MV_0$ and the top-right corner control point motion vector $MV_1$ of the target block is an obtuse angle (greater than 90 degrees), the target block is vertically split. For example, the target block may be split into two regions. Otherwise, the target block is not vertically split. Referring to FIG. 12B, when the angle between the top-left corner control point motion vector $MV_0$ and the bottom-left corner control point motion vector $MV_2$ is an obtuse angle, the target block is horizontally split into, for example, two halves. Otherwise, the target block is not horizontally split. When the affine model type of the target block is 4 parameters, the bottom-left corner control point motion vector $MV_2$ may be derived by inputting the coordinate of the bottom-left corner sample of the target block into (x, y) in Equation 1.

Based on the angle formed by the control point motion vectors, the inter-predictor 124 either skips dividing the target block or splits the target block into two regions (a left region and a right region in the case of vertical splitting, and an upper region and a lower region in case of horizontal splitting) or into 4 regions. When the dot product of the two vectors is less than 0, the angle is an obtuse angle. Accordingly, the inter-predictor 124 may determine whether the angle between the control point motion vectors is an obtuse angle based on the dot product of two vectors.

While it is illustrated in the above example that the target block is split when the angle between two control point motion vectors is an obtuse angle, the block may be split when the angle is an acute angle (an angle less than 90 degrees). In addition, the size of the target block may be considered in splitting the target block. For example, when the horizontal length exceeds a preset threshold, the target block is vertically split. When the vertical length exceeds a preset threshold, the target block is horizontally split. To split the target block, both the size of the target block and the angle between control point motion vectors may be used.

For example, the video encoding apparatus may be configured to determine whether to split the block based on the angle between control point motion vectors only when the horizontal and/or vertical length of the target block is greater than a preset threshold. As another example, when the horizontal length exceeds a preset threshold, the video encoding apparatus may be configured to determine whether to vertically split the block based on the angle between the control point motion vectors of the top-left corner and top-right corner of the target block. In addition, when the vertical length exceeds a predetermined threshold, the apparatus may be configured to determine whether to vertically split the block based on the angle between the control point motion vectors of the top-left corner and bottom-left corner of the target block.

While it has been described that the target block is split into a plurality of regions based on control point motion vectors of the target block, embodiments are not limited thereto. For example, affine motion vectors of the top left subblock, top right subblock, and bottom left subblock in the target block may be used in place of the top-left corner control point motion vector $MV_0$, the top-right corner control point motion vector $MV_1$ and the bottom-left corner control point motion vector $MV_2$.

While FIGS. 12A-12B illustrate that the target block is bisected in the horizontal or vertical direction, embodiments are not limited thereto. For example, the target block may be split into a plurality of blocks in the horizontal direction and/or a plurality of blocks in the vertical direction. Alternatively, the target block may be split into subblocks in which affine motion prediction has been performed. In this case, one subblock constitutes one region.

Each split region from the target block must be greater than or equal to the size of the subblock in which affine motion prediction has been performed. In other words, each region must be composed of one or more subblocks. For example, when the size of the subblock is 4×4, the size of the region is $2^m \times 2^n$ (where m and n are integers greater than or equal to 2).

When the target block is not split, illumination compensation parameters may be derived according to the first embodiment described above. Hereinafter, in the case that the target block is split, a method for deriving illumination compensation parameters will be described.

2. Derivation of Lighting Compensation Parameter and Illumination Compensation

The video encoding apparatus is configured to calculate illumination compensation parameters respectively corresponding to a plurality of regions. Illumination compensation is performed in units of regions or subblocks in the target block, using a plurality of illumination compensation parameters. The video encoding apparatus is configured to determine, for each of the plurality of regions, pre-constructed samples (reference samples) in the current picture and the reference picture which are to be used to derive compensation parameters. The reference samples in the current picture are selected from among pre-constructed samples adjacent to the target block. For a region spaced apart from the left boundary of the target block, pre-constructed samples adjacent to the left side of the target block are selected as reference samples. For a region spaced apart from the upper boundary of the target block, pre-constructed samples adjacent to the top side of the target block are selected as reference samples.

The reference samples in the reference picture may be selected using control point motion vectors of the target block or one or more motion vectors derived from the control point motion vectors. Hereinafter, a method for deriving illumination compensation parameters and performing illumination compensation according to various splitting types of the target block will be described in detail.

2-1. When a Target Block is Split into 4 Regions

First, a case where a target block having a horizontal length and vertical length of W and H is split in a horizontal and vertical direction and is thus composed of four regions will be described as an example. The video encoding apparatus is configured to determine pre-constructed samples (reference samples) in the current picture and the reference picture which are to be used to derive compensation parameters for the each region.

Figure 13:
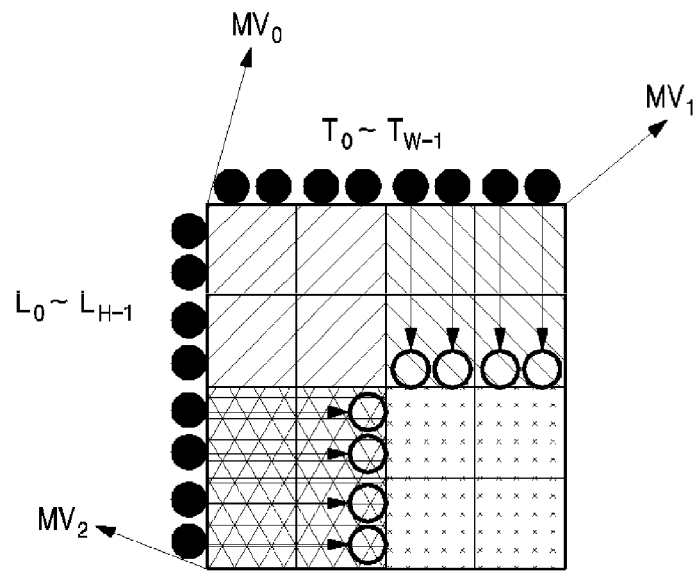
FIG. 13 is an exemplary diagram illustrating a method for determining reference samples to be used to derive compensation parameters when a target block is split into four regions according to another embodiment of illumination compensation provided by the present disclosure.
Figure 13:
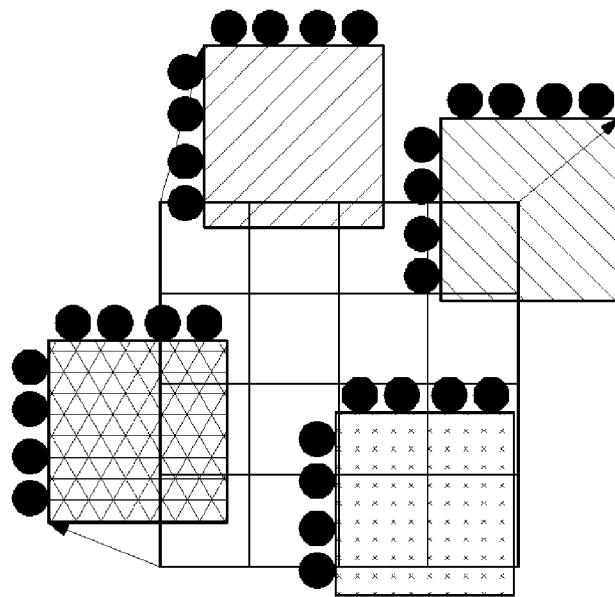

FIG. 13 is an exemplary diagram illustrating a method for determining reference samples to be used to derive compensation parameters. For the top left region in the target block, the video encoding apparatus selects $T_0$ to $T_{w/2-1}$ adjacent to the top side of the top left region and $L_0$ to $L_{H/2-1}$ adjacent to the left side of the top left region in the current picture, as reference samples to be used to derive compensation parameters. Then, a reference region corresponding to the top left region in the reference picture is determined using a representative motion vector of the top left region, and then pre-constructed samples adjacent to the top and left sides of the reference region are selected as reference samples. In particular, the representative motion vector of the top left region may be the top-left corner control point motion vector $MV_0$ of the target block.

For the top right region, the video encoding apparatus is configured to select $T_{w/2}$ to $T_{w-1}$ adjacent to the top side of the top right region as at least some reference samples to be used to derive compensation parameters. In particular, $L_0$ to $L_{H/2-1}$ adjacent to the left side of the target block may be additionally selected as reference samples. Since there are no pre-constructed samples adjacent to the left side of the top right region, $L_0$ to $L_{H/2-1}$ on the left side of the target block may be padded as reference samples on the left side of the top right region.

Then, the video encoding apparatus is configured to determine a reference region corresponding to the top right region in the reference picture using the representative motion vector of the top right region, and selects pre-constructed samples adjacent to the top side of the reference region as reference samples to be used to derive compensation parameters. When $L_0$ to $L_{H/2-1}$ adjacent to the left side of the target block are additionally selected, the video encoding apparatus may additionally select pre-constructed samples adjacent to the left side of the reference region as reference samples. Particularly, the representative motion vector of the top right region may be the top-right corner control point motion vector $MV_1$ of the target block.

For the bottom left region, the video encoding apparatus selects $L_{H/2}$ to $L_{H-1}$ adjacent to the left side of the bottom left region as at least some reference samples. $T_0$ to $T_{w/2-1}$ adjacent to the top side of the target block may be additionally selected. Then, the video encoding apparatus is configured to determine a reference region corresponding to the bottom left region in the reference picture using the representative motion vector of the bottom left region, and select pre-constructed samples adjacent to the left side of the reference region as reference samples. When $T_0$ to $T_{w/2-1}$ adjacent to the top side of the target block are additionally selected, the video encoding apparatus may be configured to additionally select pre-constructed samples adjacent to the top side of the reference region. Here, the representative motion vector of the top left region may be the motion vector $MV_1$ of the bottom-left corner control point of the target block.

Once the reference samples for each of the top left, top right, and bottom left regions in the target block are determined, the video encoding apparatus is configured to derive an illumination compensation parameter for each region by respectively inputting the reference samples selected from the reference picture and the reference samples selected from the current picture to x and y of Equation 15. The illumination compensation parameter for the bottom right region may be derived from the illumination compensation parameters of the top left, top right, and bottom left regions. For example, the illumination compensation parameter of the bottom right region may be set to an average of the illumination compensation parameters of the top right and bottom left regions.

Alternatively, the video encoding apparatus may be configured to determine a representative motion vector for the bottom right region and derive the illumination compensation parameter for the bottom right region using the representative motion vector. The representative motion vector for the bottom right region may be a control point motion vector of the bottom-right corner of the target block. The video encoding apparatus may be configured to derive the control point motion vector of the bottom-right corner of the target block by substituting the coordinate (W−1, H−1) of the bottom-right corner sample (the bottom-right corner sample of the bottom right region) in the target block for (x, y) in Equation 10 or 11.

There are no pre-constructed samples adjacent to the bottom right region of the target block. Therefore, $T_{w/2}$ to $T_{w-1}$ and $L_{H/2}$ to $L_{H-1}$ adjacent to the top and left sides of the target block are used as reference samples for deriving compensation parameters. Then, a reference region in the reference picture is determined based on the motion vector of the bottom-right corner control point of the target block, and the pre-constructed samples adjacent to the top and left sides of the reference region are selected as reference samples. The video encoding apparatus derives an illumination compensation parameter for the bottom right region using Equation 15 with the selected reference samples.

In the example above, to determine reference samples in a reference picture for derivation of a compensation parameter, a representative motion vector of each region is used. As an example, control point motion vectors (i.e., parameters for affine motion prediction) are used. However, embodiments are not limited thereto. The representative motion vector of each region may be a motion vector derived from the control point motion vectors of the target block.

In an exemplary embodiment, the representative motion vector of each region may be a motion vector of a predefined position derived from control point motion vectors of the target block. As an example, affine motion vectors of the 4×4 top left, top right, bottom left, and bottom right subblocks in the target block pre-generated in the affine motion prediction may be used as representative motion vectors of the top left, top right, bottom left, and bottom right regions, respectively. As another example, the affine motion vector at the center point of each of the top left, top right, bottom left, and bottom right regions may be used as a representative motion vector of each region. The affine motion vector at the center point of each region may be generated by substituting the center position of each region for (x, y) in Equation 10 or 11.

In another exemplary embodiment, the average of the affine motion vectors of subblocks in each region may be used as a representative motion vector of the corresponding region. As another method for determining reference samples to be used in the reference picture to derive compensation parameters, affine motion vectors of the subblocks in each region may be used instead of the representative motion vector of each region. In other words, 4×4 reference blocks at positions indicated by the affine motion vectors of 4×4 subblocks in each region may be determined in the reference picture, and pre-constructed pixels adjacent to the top and left sides of the 4×4 reference blocks may be selected as reference pixels.

Figure 14:
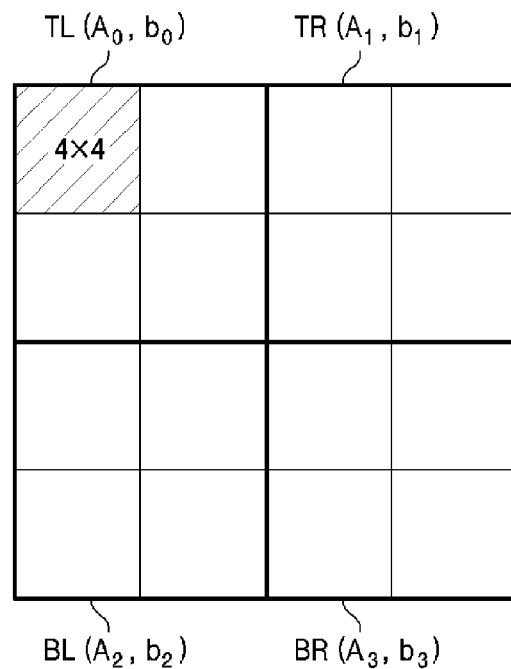
FIGS. 14 and 15 are exemplary diagrams illustrating a method for performing illumination compensation using illumination compensation parameters for four regions when a target block is split into four regions according to another embodiment of illumination compensation provided by the present disclosure.

FIG. 14 is an exemplary diagram for describing a method for performing illumination compensation using illumination compensation parameters for four regions of a target block. Each region includes one or more subblocks, which are units in which affine transformation is performed. In the example of FIG. 14, the top left region TL, the top right region TR, the bottom left region BL, and the bottom right region BR of the target block each include four subblocks (4×4 subblocks). The video encoding apparatus is configured to perform illumination compensation on prediction samples in the corresponding region (prediction samples generated through affine motion prediction) using the illumination compensation parameter of each region. Each sub-block may be compensated for using the illumination compensation parameter of the region to which the sub-block belongs. For example, four sub-blocks included in the top left region are compensated for using the illumination compensation parameters $(A_0, b_0)$ of the top left region.

In some other embodiments, the video encoding apparatus may be configured to interpolate illumination compensation parameters which respectively correspond to the subblocks in each region by using the illumination compensation parameters of the four regions TL, TR, BL, and BR, and then perform illumination compensation on each subblock using the interpolated illumination compensation parameter. As described above, the illumination compensation parameter of each region may be derived from a representative motion vector of the region. However, the representative motion vector may not reflect the motion of all subblocks in the corresponding region.

For example, the illumination compensation parameters of the respective regions may be derived from the control point motion vectors of the top-left, top-right, bottom-left, and bottom-right corner control points of the target block, or affine motion vectors of the 4×4 top left, top right, bottom left, and bottom right subblocks of the target block. In particular, the motion of the 4×4 top left, top right, bottom left, and bottom right subblocks may have greater influence on derivation of the illumination compensation parameters. Accordingly, the video encoding apparatus may be configured to derive the illumination compensation parameters of the respective subblocks through interpolation using the illumination compensation parameters of the respective regions.

Figure 15:
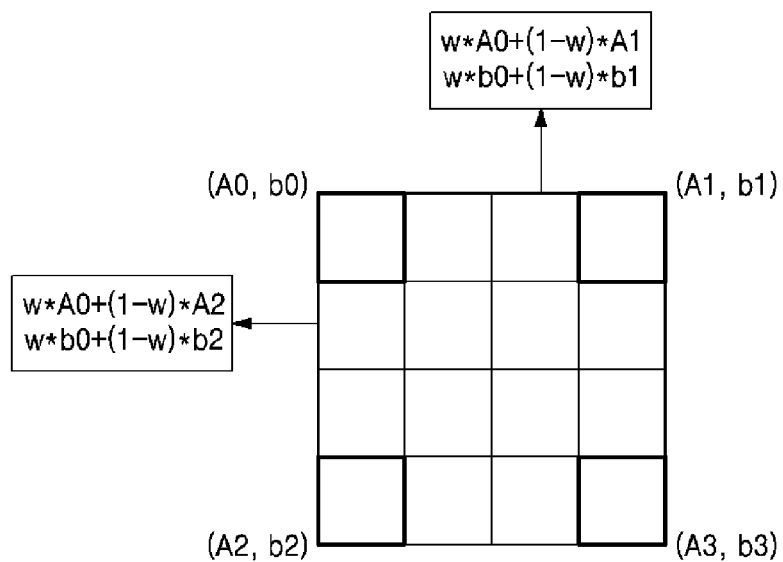

FIG. 15 is an exemplary diagram illustrating a method for interpolating illumination compensation parameters of subblocks using illumination compensation parameters of respective regions. $(A_0, b_0)$ to $(A_3, b_3)$ are illumination compensation parameters of the respective regions derived from the control point motion vectors of the top-left corner, top-right corner, bottom-left corner, and bottom-right corner of the target block, respectively, or from the affine motion vectors of the 4×4 top left, top right, bottom left, and bottom right subblocks of the target block. Additionally, $(A_0, b_0)$ is assumed to be the illumination compensation parameter of the top left 4×4 subblock in the top left region of the target block. Similarly, $(A_1, b_1)$ to $A_3, b_3$) are assumed to be the illumination compensation parameter of the top right 4×4 subblock in the top right region, the illumination compensation parameter of the bottom left 4×4 subblock in the bottom left region, and the illumination compensation parameter of the bottom right 4×4 subblock in the bottom right region. In other words, $(A_0, b_0)$ to $(A_3, b_3)$ are assumed to be the compensation parameters of the four corner subblocks of the target block.

The video encoding apparatus interpolates compensation parameters of other subblocks using the compensation parameters of the four corner subblocks. Bi-linear interpolation using four corner subblocks or linear interpolation may be performed. For example, the subblocks in the first row in the target block may be interpolated using $(A_0, b_0)$ and $(A_2, b_2)$. The subblocks in the first column in the target block may be interpolated using $(A_0, b_0)$ and $(A_2, b_2)$. In this way, the compensation parameters of all subblocks are derived.

In particular, a filter coefficient or weight used for interpolation may be set according to a difference between the positions of the corner subblocks and the positions of the target subblock (or the distance between the corner subblocks and the target subblock). A smaller difference in position is assigned a greater weight.

Alternatively, the filter coefficient or weight used for interpolation may be set according to a difference between the motion vectors used to derive the compensation parameters of the corner subblocks (the control point motion vectors of the top-left, top-right, bottom-left, and bottom-right corners of the target block, or the affine motion vectors of the top left, top right, bottom left, and bottom right 4×4 subblocks of the target block) and the affine motion vector of the target subblock. A smaller difference in motion vector is assigned a greater weight.

2.2 when the Target Block is Split into Two Regions

Figure 16:
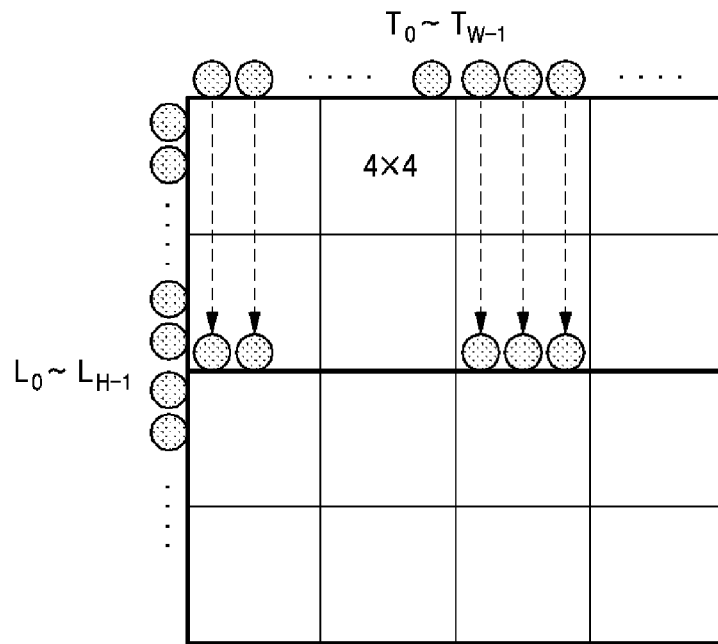
FIGS. 16 and 17 are exemplary diagrams illustrating a method for performing illumination compensation for each region when a target block is split into two regions according to another embodiment of illumination compensation provided by the present disclosure.

Even when the target block is split into two regions, the illumination compensation parameter of each region may be derived in the same manner as when the target block is split into four regions. For example, referring to FIG. 16, the video encoding apparatus selects, as reference samples in a current picture for deriving a compensation parameter of a top region, pre-constructed samples $T_0$ to $T_{w-1}$ adjacent to the top side of the top region and pre-constructed samples $L_0$ to $L_{H/2-1}$ adjacent to the left side of the top region. Then, the video encoding apparatus is configured to determine a reference region in the reference picture using a representative motion vector of the top region, and selects the pre-constructed samples adjacent to the top and left sides of the reference region as reference samples.

The representative motion vector of the top region may be a control point motion vector of the top-left corner of the target block. Alternatively, it may be a motion vector derived from control point motion vectors of the target block. For example, the affine motion vector of the top left 4×4 subblock in the top region may be used, or an affine motion vector corresponding to the center point of the top region may be used. As another example, the average of affine motion vectors of the subblocks in each region may be used as a representative motion vector of the corresponding region.

The video encoding apparatus is configured to select, as reference samples in the current picture for deriving a compensation parameter of a bottom region, pre-constructed samples $T_0$ to $T_{w-1}$ adjacent to the top side of the target block, and pre-constructed samples $L_{H/2}$ to $L_{H-1}$ adjacent to the left side of the bottom region. Then, the video encoding apparatus is configured to determine a reference region in the reference picture using a representative motion vector of the bottom region, and select the pre-constructed samples adjacent to the top and left sides of the reference region as reference samples.

The representative motion vector of the bottom region may be a control point motion vector of the bottom left corner of the target block. Alternatively, it may be a motion vector derived from control point motion vectors of the target block. For example, the affine motion vector of the bottom left 4×4 subblock in the bottom region may be used or the affine motion vector corresponding to the center point of the bottom region may be used. As another example, the average of the affine motion vectors of subblocks in the bottom region may be used as the representative motion vector of the bottom region.

In the example above, as a method for determining reference samples in a reference picture to be used for deriving a compensation parameter, a representative motion vector of each region is used. However, affine motion vectors of subblocks in each region may be used instead of the representative motion vector of each region. That is, for each region, 4×4 reference blocks at positions indicated by affine motion vectors of 4×4 subblocks may be determined in the reference picture, and pre-constructed pixels adjacent to the top and left sides of the 4×4 reference blocks may be selected as reference pixels.

For each region, the video encoding apparatus is configured to input the reference samples selected in the reference picture and the reference samples selected in the current picture to x and y in Equation 15, respectively, to derive compensation parameters for the respective regions. In addition, the video encoding apparatus performs illumination compensation on prediction samples in the corresponding region (prediction samples generated through affine motion prediction), using the illumination compensation parameter of each region. Each subblock may be compensated for using the illumination compensation parameter of the region to which the subblock belongs.

Alternatively, the video encoding apparatus may be configured to interpolate the illumination compensation parameters which respective correspond to the subblocks by using the illumination compensation parameters of respective regions, and perform illumination compensation on each subblock using the interpolated parameters, as in the case where the target block is split into four regions.

Figure 17:
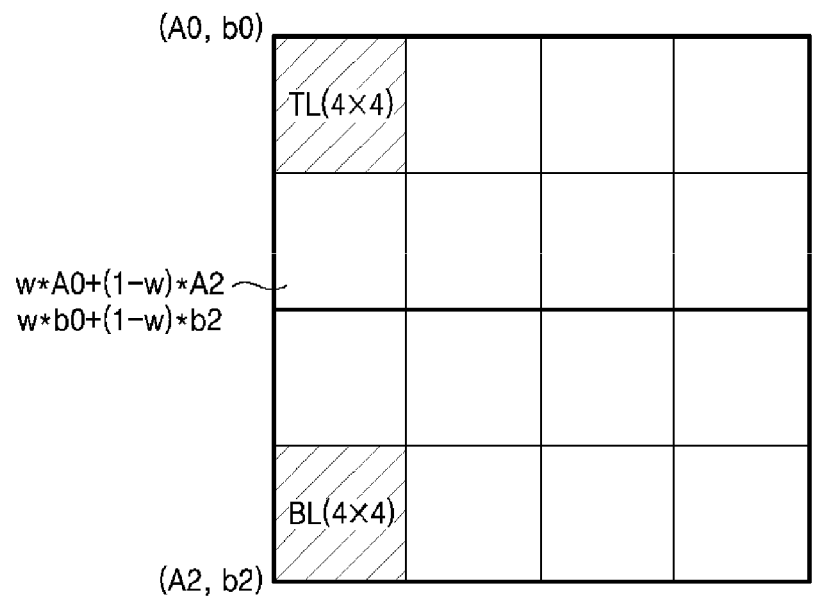

Interpolation may be applied when the representative motion vector of each region used to derive the compensation parameter is related to a specific position in each region. For example, the control point motion vectors of the top-left and bottom-left corner of the target block, or the affine motion vectors of the top left and bottom left 4×4 subblocks of the target block may be used as representative motion vectors. In particular, the compensation parameters of the two regions are regarded as illumination compensation parameters of the top left and bottom left corner subblocks TL and BL in the target block, as shown in FIG. 17.

The video encoding apparatus may be configured to interpolate the compensation parameter of the target subblock by applying a weight to the compensation parameters $(A_0, b_0)$ of the top region and the compensation parameters $(A_2, b_2)$ of the bottom region. In particular, the weight may be allocated according to the distance between the top left and bottom left corner subblocks in the target block and the target subblock. Alternatively, it may be set according to the difference between the motion vectors used to derive the compensation parameters of the two regions (control point motion vectors of the top-left corner and bottom-left corner of the target block, or affine motion vectors of the top left and bottom left 4×4 subblocks of the target block) and the affine motion vector of the target subblock. As the difference between the motion vectors decreases, the weight increases.

Even when the target block is vertically split into two regions, the same method as when the target block is horizontally split into two regions may be used. In particular, the representative motion vectors of the two regions (the left region and the right region) may be, for example, the control point motion vectors of the top-left corner and top-right corner of the target block, or the affine motion vectors of the top left and top right 4×4 subblocks of the target block. Alternatively, the affine motion vector of the center point of each region or the average of the affine motion vectors of subblocks of each region may be used as representative motion vector of each region. Other operations are the same as in the case of the horizontal splitting described above or may be clearly derived therefrom, and thus further detailed descriptions thereof are omitted.

2.3 when the Target Block is Split into More than 4 Subblocks

Figure 18:
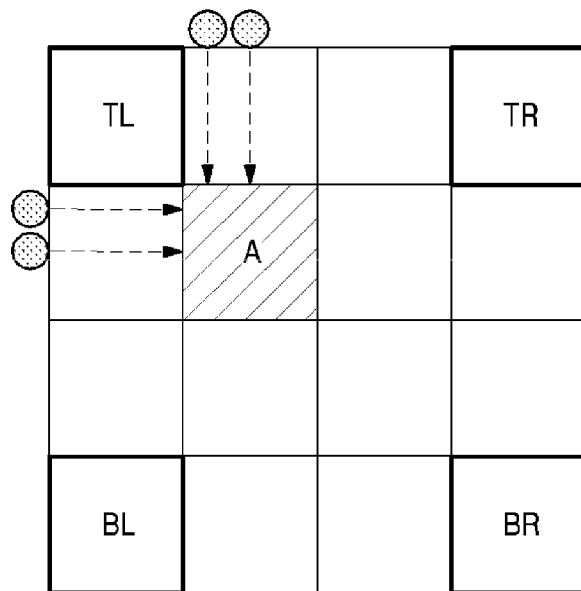
FIG. 18 are exemplary diagrams illustrating a method for performing illumination compensation for each region when a target block is split into a plurality of regions more than four regions according to another embodiment of the illumination compensation provided by the present disclosure.

As described above, the target block may be split into $2^m$ and $2^n$ blocks (where m and n are integers greater than or equal to 2) in the horizontal and vertical directions. For example, the target block may be split into subblocks, which are units in which affine motion prediction is performed. This case is illustrated in FIG. 18. Referring to FIG. 18, the video encoding apparatus derives illumination compensation parameters for the top left region TL, top right region TR, bottom left region BL, and bottom right region BR of the target block using the method as described in section 2.1.

For the remaining regions other than these four regions, the illumination compensation parameters of the remaining regions may be derived by applying the interpolation described in section 2.1. Alternatively, for the remaining regions, the illumination compensation parameters may be derived in the same manner as in the case of the top left region TL, the top right region TR, the bottom left region BL, and the bottom right region BR. For example, for region A, the video encoding apparatus selects pre-constructed samples located on the top side of region A and adjacent to the target block and pre-constructed samples located on the left side of region A and adjacent to the target block as reference pixels in the current picture. In addition, reference samples in the reference picture are selected using a motion vector of the top-left corner control point of region A, an affine motion vector of a 4×4 subblock located at the top left corner of region A, or an affine motion vector of the center point of region A. The illumination compensation parameter of region A is derived using the selected reference samples.

The illumination compensation technique described above is a technique using a motion vector that can be obtained through pre-constructed samples and affine motion prediction. Accordingly, the video decoding apparatus may be configured to perform illumination compensation in the same manner as the video encoding apparatus. It is not required that the video encoding apparatus signals additional information for the illumination compensation process to the video decoding apparatus.

The illumination compensation technique described above may be used along with other coding tools for compensating for motion for a target block in units of subblocks in addition to affine motion prediction. For example, it may be applied to a bidirectional optical flow. The video encoding apparatus and the video decoding apparatus may be configured to generate prediction samples for each subblock by performing a bidirectional optical flow on a subblock-by-subblock basis for the target block, and additionally may be configured to perform the fore-mentioned illumination compensation on the prediction samples in the target block. The illumination compensation technique applied to the bidirectional optical flow is the same as the illumination compensation technique described above except for the following.

In the illumination compensation technique described above, control point motion vectors of the target block or affine motion vectors of subblocks are used for splitting of the target block and calculation of a representative motion vector of each region split from the target block. However, in the case of a bidirectional optical flow, there is neither a control point motion vector nor an affine motion vector. Accordingly, when the illumination compensation technique is applied to the bidirectional optical flow, optical flows ($v_x$, $v_y$) of subblocks are used in place of control point motion vectors or affine motion vectors of the subblocks.

V. Syntax Signaling

Another aspect of the present disclosure relates to a technique for signaling of high-level syntaxes for controlling on/off of various tools described above. The above-described affine motion prediction, sample-by-sample adjustment for affine motion prediction samples, adaptive motion vector resolution, and illumination compensation are coding tools used to improve the video encoding efficiency. However, for specific content such as, for example, screen content, the aforementioned various coding tools may not contribute to improving compression performance. Accordingly, a coding unit based signaling of whether to apply each coding tool or a coding unit based decision of whether to apply each coding tool may rather degrade coding efficiency or increase computational complexity. The present disclosure provides a signaling technique for efficiently controlling the above-described coding tools.

To encode a sequence of pictures, the video encoding apparatus is configured to encode a first high-level syntax element of the sequence level indicating whether a plurality of coding tools is disabled. The first high-level syntax element may be encoded in the header of the sequence, that is, the SPS. In particular, the plurality of coding tools includes affine motion prediction, and also includes at least one of sample-by-sample adjustment for affine motion prediction samples, adaptive motion vector resolution, and illumination compensation.

When the first high-level syntax element indicates that all the plurality of coding tools is disabled, no coding tools are applied to the encoding of the sequence. In other words, the above-described coding tools are not applied to any pictures in the sequence. When the first high-level syntax element indicates that a plurality of coding tools is not disabled, the plurality of coding tools may be used to encode a corresponding sequence. For example, affine motion prediction may be applied to all pictures in the sequence. Accordingly, the video encoding apparatus may encode a coding unit flag indicating whether encoding using affine motion prediction has been applied to each of the coding units and transmit the same to the video decoding apparatus.

When it is indicated by the coding unit flag that affine motion prediction has been applied to a corresponding coding unit, the video decoding apparatus may be configured to perform the above-described affine motion prediction on the coding unit. When the first high-level syntax element indicates that a plurality of coding tools is not disabled, the video encoding apparatus may be configured to encode one or more second high-level syntax elements indicating whether each coding tool in at least a portion of the plurality of coding tools is allowed at a sequence level or a picture level.

In some embodiments for encoding the one or more second high-level syntax elements, the video encoding apparatus encodes, for each coding tool, a sequence level flag indicating whether the corresponding coding tool is allowed in the SPS. When the sequence level flag indicates that the corresponding coding tool is not allowed, the corresponding coding tool is not used to encode the pictures belonging to the sequence. In addition, the video encoding apparatus is configured to encode a picture level flag indicating whether a corresponding coding tool is allowed in a picture header (i.e., PPS) of each of the pictures belonging to the sequence depending on the value of the sequence level flag.

For example, when the sequence level flag indicates that the corresponding coding tool is allowed at the sequence level, the picture level flag for indicating whether the corresponding coding tool is allowed at the picture level is encoded. When the first high-level syntax element indicates that all the plurality of coding tools is disabled or the sequence level flag indicates that the corresponding coding tool is not allowed at the sequence level, the picture level flag is not separately coded. In particular, the video decoding apparatus is configured to automatically set the picture level flag to a value indicating that the corresponding coding tool is not allowed.

Picture level flags for coding tools other than the affine motion prediction may be signaled depending on the picture level flag for affine motion prediction. When the picture level flag for affine motion prediction indicates that affine motion prediction is not allowed at the picture level, picture level flags for other coding tools are not coded, and the other coding tools are not allowed at the picture level. When the picture level flags for the other coding tools are not included in the bitstream, the video decoding apparatus is configured to set each picture level flag to a value indicating that the corresponding coding tools are not allowed at the picture level.

The video decoding apparatus may be configured to set, at the picture level, whether to allow a corresponding coding tool from the picture level flag signaled from the video encoding apparatus or a picture level flag whose value is automatically set. The second high-level syntax element for affine motion prediction may be omitted. In particular, whether affine motion prediction is allowed at the sequence level is controlled by the first high-level syntax. The video decoding apparatus is configured to decode the first high-level syntax from the video encoding apparatus and then determines whether to allow affine motion prediction at the sequence level.

According to the above-described syntax structure, the video encoding apparatus may be configured to adaptively determine whether to allow coding tools at the sequence level and the picture level. In addition, the video decoding apparatus may be configured to adaptively determine whether to allow coding tools at the sequence level and the picture level by decoding the syntaxes signaled from the video encoding apparatus.

In some other embodiments for encoding the one or more second high-level syntax elements, the picture level flag of the above-described embodiment may be replaced with a slice level flag. In other words, when the sequence level flag indicates that the corresponding coding tool is allowed at the sequence level, the video encoding apparatus encodes, in the slice header, a slice level flag for indicating whether the corresponding coding tool is allowed at the slice level. When the sequence level flag indicates that the corresponding coding tool is not allowed, the slice level flag is not coded. The video encoding apparatus may be configured to adaptively determine whether to allow coding tools at the sequence level and the slice level. The video decoding apparatus may be configured to determine whether to allow each tool at the slice level through the slice level flag.

In some other embodiments for encoding the one or more second high-level syntax elements, the sequence level flag may be omitted. The picture level flag or slice level flag is signaled depending on the first high-level syntax element. When the first high-level syntax element indicates that a plurality of coding tools is allowed, the picture level flag or the slice level flag is coded in the picture header or slice header.

It should be understood that the exemplary embodiments described above may be implemented in many different ways. The functions described in one or more examples may be implemented in hardware, software, firmware, or any combination thereof. It should be understood that the functional components described herein have been labeled ".unit" to further emphasize their implementation independence.

Various functions or methods described in the present disclosure may be implemented with instructions stored in a non-transitory recording medium that can be read and executed by one or more processors. Non-transitory recording media include, for example, all types of recording devices in which data is stored in a form readable by a computer system. For example, non-transitory recording media include storage media such as erasable programmable read only memory (EPROM), flash drives, optical drives, magnetic hard drives, and solid state drives (SSDs).

Although exemplary embodiments have been described for illustrative purposes, those skilled in the art will appreciate that and various modifications and changes are possible, without departing from the idea and scope of the embodiments. Exemplary embodiments have been described for the sake of brevity and clarity. Accordingly, one of ordinary skill would understand that the scope of the embodiments is not limited by the embodiments explicitly described above but is inclusive of the claims and equivalents thereto.

What is claimed is:

1. A video decoding apparatus for decoding a sequence of coded pictures on a block-by-block basis, comprising:
    a decoder configured to:
        set, at a sequence level, whether affine motion prediction is allowed by decoding a first high-level syntax element from a bitstream, and
        set, at a picture level, whether each of at least one coding tool is allowed by decoding one or more second high-level syntax elements for each of the at least one coding tool from the bitstream depending on the first high-level syntax element, the at least one coding tool including sample-by-sample adjustment of affine motion prediction samples; and
    a predictor configured to determine, when the setting at the sequence level indicates that the affine motion prediction is allowed, a plurality of control point motion vectors of a target block encoded using the affine motion prediction, and generate affine prediction samples for each of subblocks in the target block by performing affine motion prediction in the unit of the subblocks using the control point motion vectors, wherein the subblocks have a size of 4×4,
    wherein, when it is identified, based on the setting at the picture level, that the sample-by-sample adjustment of the affine motion prediction samples is allowed for a current picture containing the target block, the predictor is configured to modify sample values of the affine prediction samples by compensating for motion according to a sample position in each of the subblocks based on the control point motion vectors of the target block.

2. The apparatus of claim 1, wherein the first high-level syntax element is decoded from a header of the sequence.

3. The apparatus of claim 2, wherein the decoder decodes the one or more second high-level syntax elements for the sample-by-sample adjustment of the affine motion prediction samples by:
    when the first high-level syntax element indicates that the affine motion prediction is allowed, decoding a sequence level flag indicating whether the sample-by-sample adjustment of the affine motion prediction samples is allowed from the header of the sequence; and
    depending on the sequence level flag, decoding a picture level flag indicating whether the sample-by-sample adjustment of the affine motion prediction samples is allowed from a picture header of each of the pictures belonging to the sequence.

4. The apparatus of claim 3, wherein, when the first high-level syntax element indicates that the affine motion prediction is not allowed or the sequence level flag indicates that the sample-by-sample adjustment is not allowed, the decoder is configured to set the picture level flag to a value indicating that the sample-by-sample adjustment is not allowed, without being decoded from the picture header.

5. The method for claim 1, wherein, when the first high-level syntax element indicates that the affine motion prediction is not allowed, any of the affine motion prediction and the at least one coding tool is not allowed for all the pictures in the sequence.

6. The apparatus of claim 1, wherein the predictor is configured to modify the sample values of the affine prediction samples by:
generating a motion offset resulting from a difference between a sample position in a target subblock to be modified and a center of the target subblock, using the control point motion vectors of the target block;
generating horizontal and vertical gradients with respect to the sample position in the target subblock;
generating a sample offset for an affine prediction sample corresponding to the sample position in the target subblock using the horizontal and vertical gradients and the motion offset; and
adding the sample offset to the sample value of the affine prediction sample corresponding to the sample position.

7. The apparatus of claim 6, wherein the motion offset generated for the sample position in the target subblock is reused as a motion offset for the same sample position in another subblock of the target block.

8. A video encoding apparatus for encoding a sequence of coded pictures on a block-by-block basis, comprising:
an encoder configured to:
encode, in a header of the sequence, a sequence-level first high-level syntax element to indicate whether both affine motion prediction and at least one coding tool are disabled, the at least one coding tool including sample-by-sample adjustment of affine motion prediction samples, and
depending on the first high-level syntax element, encode one or more second high-level syntax elements indicating a setting of a sequence level or a picture level as to whether each of the at least one coding tool is allowed; and
a predictor configured to, when the first high-level syntax element indicates that both the affine motion prediction and the at least one coding tool are not disabled, determine a plurality of control point motion vectors for a target block to be encoded by the affine motion prediction, and generate affine prediction samples for each of subblocks by performing subblock-by-subblock affine motion prediction using the control point motion vectors, wherein the subblocks have a size of 4×4,
wherein, when the sample-by-sample adjustment of the affine motion prediction samples is allowed for a current picture containing the target block, the predictor is configured to modify sample values of the affine prediction samples by compensating for motion according to a sample position in each of the subblocks based on the control point motion vectors of the target block.

9. The apparatus for claim 8, wherein the encoder is configured to encode the one or more second high-level syntax elements for the sample-by-sample adjustment of the affine motion prediction samples by:
when the first high-level syntax element indicates that the affine motion prediction is allowed, encoding a sequence level flag indicating whether the sample-by-sample adjustment of the affine motion prediction samples is allowed in the header of the sequence; and
depending on the sequence level flag, encoding a picture level flag indicating whether the sample-by-sample adjustment is allowed in a picture header of each of the pictures belonging to the sequence.

10. The apparatus of claim 9, wherein, when the first high-level syntax element indicates that the affine motion prediction is not allowed or the sequence level flag indicates that the sample-by-sample adjustment is not allowed, the encoder is configured not to encode the picture level flag.

11. The apparatus for claim 8, wherein the predictor is configured to modify the sample values of the affine prediction samples by:
generating a motion offset resulting from a difference between a sample position in a target subblock to be modified and a center of the target subblock using the control point motion vectors of the target block;
generating horizontal and vertical gradients with respect to the sample position in the target subblock;
generating a sample offset for an affine prediction sample corresponding to the sample position in the target subblock using the horizontal and vertical gradients and the motion offset; and
adding the sample offset to the sample value of the affine prediction sample corresponding to the sample position.

12. The apparatus of claim 11, wherein the motion offset generated for the sample position in the target subblock is reused as a motion offset for the same sample position in another subblock of the target block.

13. A non-transitory computer readable medium storing a bitstream generated by a video encoding method, the method comprising:
encoding, in a header of the sequence, a sequence-level first high-level syntax element to indicate whether both affine motion prediction and at least one coding tool are disabled, the at least one coding tool including sample-by-sample adjustment of affine motion prediction samples;
depending on the first high-level syntax element, encoding one or more second high-level syntax elements indicating a setting of a sequence level or a picture level as to whether each of the at least one coding tool is allowed; and
when the first high-level syntax element indicates that both the affine motion prediction and the at least one coding tool are not disabled, determining a plurality of control point motion vectors for a target block to be encoded by the affine motion prediction, and generating affine prediction samples for each of subblocks by performing subblock-by-subblock affine motion prediction using the control point motion vectors, wherein the subblocks have a size of 4×4,
when the sample-by-sample adjustment of the affine motion prediction samples is allowed for a current picture containing the target block, modifying sample values of the affine prediction samples by compensating for motion according to a sample position in each of the subblocks based on the control point motion vectors of the target block.

\* \* \* \* \*